(12) United States Patent
Craymer et al.

(10) Patent No.: US 8,947,197 B2
(45) Date of Patent: Feb. 3, 2015

(54) METHOD AND APPARATUS FOR VERIFYING A PERSON'S IDENTITY OR ENTITLEMENT USING ONE-TIME TRANSACTION CODES

(75) Inventors: Jonathan Craymer, Allsworth (GB); Stephen Howes, Huntingdon (GB)

(73) Assignee: Safenet UK Limited, Blackwater (GB)

( * ) Notice: Subject to any disclaimer, the term of this patent is extended or adjusted under 35 U.S.C. 154(b) by 1230 days.

(21) Appl. No.: 12/130,534

(22) Filed: May 30, 2008

(65) Prior Publication Data

US 2009/0284344 A1 Nov. 19, 2009

Related U.S. Application Data

(63) Continuation-in-part of application No. PCT/GB2006/050422, filed on Nov. 30, 2006.

(60) Provisional application No. 60/774,225, filed on Feb. 17, 2006.

(30) Foreign Application Priority Data

| Dec. 1, 2005 | (GB) | .................................... 0524414.0 |
| Jan. 31, 2006 | (GB) | .................................... 0601910.3 |
| Jul. 13, 2006 | (GB) | .................................... 0613835.8 |
| Jul. 27, 2006 | (GB) | .................................... 0614902.5 |

(51) Int. Cl.
*G05B 19/00* (2006.01)
*G07C 9/00* (2006.01)
(Continued)

(52) U.S. Cl.
CPC .......... *G07C 9/00142* (2013.01); *G06Q 20/341* (2013.01); *G06Q 20/385* (2013.01);
(Continued)

(58) Field of Classification Search
CPC ..... G06F 19/323; G06F 21/31; G06F 3/0416; G06F 3/044; G06F 21/36; A61N 2005/1074; A61N 5/1048; G06K 19/10; G06K 7/0008

USPC ............. 340/1.1, 5.1, 5.2; 380/825.31, 45, 46
See application file for complete search history.

(56) References Cited

U.S. PATENT DOCUMENTS

| 4,333,090 A | 6/1982 | Hirsch |
| 4,734,040 A * | 3/1988 | North et al. ................... 434/433 |

(Continued)

FOREIGN PATENT DOCUMENTS

| EP | 1 239 426 A | 9/2002 |
| EP | 1475721 A1 | 11/2004 |

(Continued)

OTHER PUBLICATIONS

Communication of a notice of opposition issued Aug. 7, 2013; Application No. 06820648.1.
(Continued)

*Primary Examiner* — James Yang
(74) *Attorney, Agent, or Firm* — Arent Fox LLP

(57) ABSTRACT

A method for verifying a person's identity is of the general type which comprises storing a personal pattern of a predetermined number of locations on a grid in association with personal identification data, and subsequently using the pattern in a verification process. According to the invention, the subsequent verification process comprises the steps of: (a) presenting to the person a challenge grid of locations occupied by a pseudo-random set of symbols, and challenging the person to identify a response set of symbols occupying locations in the challenge grid corresponding to the stored personal pattern; (b) receiving from the person the response set; (c) generating from the challenge grid and the stored pattern a verification set of symbols occupying locations in the challenge grid corresponding to the stored personal pattern; (d) comparing the response set of symbols with the verification set of symbols; and (e) verifying the identity of the person if the response set is the same as the verification set.

69 Claims, 12 Drawing Sheets

(51) Int. Cl.
*G06Q 20/34* (2012.01)
*G06Q 20/38* (2012.01)
*G06Q 20/40* (2012.01)
*G07F 7/10* (2006.01)
*H04L 9/32* (2006.01)

(52) U.S. Cl.
CPC ............ *G06Q20/40145* (2013.01); *G07F 7/10* (2013.01); *G07F 7/1008* (2013.01); *G07F 7/1025* (2013.01); *G07F 7/1041* (2013.01); *H04L 9/321* (2013.01); *H04L 9/3226* (2013.01); *H04L 2209/56* (2013.01)
USPC .............................................. 340/5.2; 380/45

(56) References Cited

U.S. PATENT DOCUMENTS

| | | | |
|---|---|---|---|
| 4,748,668 A | | 5/1988 | Shamir et al. |
| 4,932,056 A | | 6/1990 | Shamir |
| 5,233,655 A | | 8/1993 | Shapiro |
| 5,465,084 A | * | 11/1995 | Cottrell ........................ 340/5.27 |
| 5,546,523 A | * | 8/1996 | Gatto ............................ 715/811 |
| 5,581,615 A | | 12/1996 | Stern |
| 5,712,627 A | | 1/1998 | Watts |
| 6,246,769 B1 | * | 6/2001 | Kohut ............................ 380/45 |
| 6,434,702 B1 | | 8/2002 | Maddalozzo, Jr. et al. |
| 7,036,016 B1 | * | 4/2006 | Smith, Jr. ...................... 713/185 |
| 2002/0120583 A1 | * | 8/2002 | Keresman et al. ............. 705/65 |
| 2003/0182558 A1 | | 9/2003 | Lazzaro et al. |
| 2004/0026496 A1 | * | 2/2004 | Zuili ............................ 235/379 |
| 2004/0193882 A1 | | 9/2004 | Singerle, Jr. |

FOREIGN PATENT DOCUMENTS

| | | |
|---|---|---|
| FR | 2 459 514 A | 1/1981 |
| FR | 2622322 A1 | 10/1987 |
| WO | WO 95/20802 | 8/1995 |
| WO | WO 95/20802 A | 8/1995 |
| WO | WO 2004/015620 A1 | 2/2004 |
| WO | WO 2004/036393 A1 | 4/2004 |

OTHER PUBLICATIONS

European Patent No. 1964078 (06820648.1); Opposition by Cabinet Plasseraud; Observations Under Rule 79(1) EPC.
European Patent No. 1964078 (06820648.1); Opposition by Winfrasoft Limited; Observations under Rule 79(1) EPC.
Thorpe, J. et al. "Towards Secure Design Choices for Implementing Graphical Passwords". School of Computer Science, Carleton University. 27 pages.

* cited by examiner

Fig 3

|    | A | B | C | D | E | F | G | H | I | J | K | L | M | N | O | P | Q |
|----|---|---|---|---|---|---|---|---|---|---|---|---|---|---|---|---|---|
| 1  | 3 | 5 | 7 | 9 | 4 | 7 | 3 | 2 | 0 | 2 | 7 | 4 | 9 | 7 | 8 | 8 | 4 |
| 2  | 5 | 3 | 5 | 7 | 9 | 5 | 6 | 4 | 8 | 0 | 1 | 2 | 4 | 2 | 7 | 9 | 4 |
| 3  | 0 | 4 | 7 | 9 | 4 | 9 | 4 | 9 | 3 | 0 | 3 | 8 | 2 | 8 | 2 | 1 | 9 |
| 4  | 8 | 2 | 6 | 7 | 4 | 8 | 0 | 4 | 7 | 4 | 8 | 0 | 9 | 8 | 4 | 6 | 3 |
| 5  | 0 | 3 | 2 | 6 | 2 | 6 | 6 | 7 | 5 | 8 | 0 | 4 | 6 | 4 | 3 | 2 | 5 |
| 6  | 5 | 5 | 6 | 7 | 8 | 4 | 2 | 6 | 2 | 6 | 8 | 0 | 4 | 6 | 2 | 1 | 8 |
| 7  | 1 | 1 | 4 | 6 | 4 | 8 | 7 | 9 | 8 | 5 | 4 | 2 | 1 | 4 | 2 | 0 | 7 |
| 8  | 2 | 4 | 8 | 2 | 4 | 5 | 6 | 1 | 7 | 9 | 1 | 5 | 2 | 1 | 5 | 6 | 4 |
| 9  | 4 | 6 | 8 | 4 | 1 | 0 | 2 | 0 | 4 | 0 | 4 | 5 | 2 | 4 | 1 | 5 | 1 |
| 10 | 8 | 7 | 4 | 8 | 5 | 6 | 3 | 7 | 1 | 7 | 9 | 0 | 5 | 0 | 4 | 7 | 5 |
| 11 | 7 | 3 | 4 | 7 | 5 | 1 | 0 | 1 | 4 | 5 | 1 | 8 | 4 | 5 | 1 | 5 | 1 |
| 12 | 0 | 5 | 0 | 7 | 5 | 1 | 5 | 7 | 1 | 8 | 7 | 1 | 5 | 0 | 4 | 4 | 0 |

Fig 4 a tessellation of triangles a tessellation of squares a tessellation of hexagons 4.4.4.4

6.6.6

3.3.3.3.3.3

3.3.3.4.4

3.3.4.3.4

3.4.6.4

3.6.3.6

4.8.8

4.6.12

METHOD AND APPARATUS FOR VERIFYING A PERSON'S IDENTITY OR ENTITLEMENT USING ONE-TIME TRANSACTION CODES

CROSS-REFERENCE TO RELATED APPLICATION

This non-provisional application is a continuation-in-part of and claims the benefit of International Application No. PCT/GB2006/050422, filed Nov. 30, 2006, which claims priority to Application No. 0524414.0 filed Dec. 1, 2005 in Great Britain, which claims priority to Application No. 0601910.3 filed 31 Jan. 2006 in Great Britain, which claims priority to U.S. Provisional Patent Application Ser. No. 60/774,225, filed Feb. 17, 2006, which claims priority to Application No. 0613835.8, filed Jul. 13, 2006 in Great Britain which claims priority to Application No. 0614902.5, filed Jul. 27, 2006 in Great Britain. The disclosure of the prior applications are hereby incorporated herein in their entirety by reference.

FIELD OF THE INVENTION

The present invention relates to a method and apparatus for verifying a person's identity or a person's entitlement, e.g. to access premises or to obtain certain services

BACKGROUND TO THE INVENTION

Credit card fraud is a major problem to retailers and credit card companies alike. Many credit card companies have addressed this problem with the introduction of 'Chip and Pin' technologies but this does not address the problem of 'Card not present' fraud which is on the increase as more people make on-line credit card purchases or purchase goods by telephone.

Furthermore, with the prevalence of computer viruses and in particular 'Trojans' which capture keystrokes (including credit card and personal identification numbers ("PINs")) sending credit card information and PINs to an untrusted second party is inherently insecure.

The present invention provides a method by which fraud can be reduced through the use of 'one-time' transaction codes, as well as providing a general means of validating someone's identity or entitlement.

Potential uses include credit card purchases, premise and vehicle entry systems (including vehicle ignition switching), bank customer verification, passport verification, a replacement for passwords, or in any other situation where a person's 'entitlement to service' is required.

In U.S. Pat. No. 6,246,769 there is disclosed a system for replacing PINS with a transaction specific code which the user identifies from a matrix of symbols by reference to a personal randomly chosen pattern and sequence of matrix positions which the user registers with a central database along with personal identification data/account data. When a transaction, for example, is to be made, the user's pattern is retrieved from the database, and the transaction specific code is created and then placed in a matrix in the pattern positions. The remaining spaces are filled with symbols not used in the transaction specific code, to hide the code, before the matrix is displayed to the user with a request to enter the symbols occupying the user's personal pattern positions. The terminal then establishes that the user has entered the correct hidden code before seeking authorisation of the transaction.

In many situations, this process is undesirable for two principal reasons. Firstly, it requires the transmission of the user's stored personal pattern from the central database to the user terminal (ATM, for example), which is potentially insecure, and secondly the transaction requires either two separate data calls to the central database, or one continuous connection for the duration of the transaction. In either case, this is unacceptable for shop or bank transactions, as it would considerably increase the cost of operating the system—such transactions preferably only involve one brief communication to obtain authorisation for the transaction—while possibly increasing the risk of a breach of transaction security if the authorisation process required a continuous connection for the duration of the transaction.

In addition, the process disclosed in U.S. Pat. No. 6,246,679 cannot be used for off-line payment systems, since it requires access to the user's stored personal pattern.

SUMMARY OF THE INVENTION

The present invention provides a method for verifying a person's identity, comprising storing a personal pattern of a number of locations on a grid in association with personal identification data, and subsequently using the pattern in a verification process, wherein the subsequent verification process comprises the steps of:

(a) presenting to the person a challenge grid of locations occupied by a pseudo-random set of symbols, and challenging the person to identify a response set of symbols occupying locations in the challenge grid corresponding to the stored personal pattern;

(b) receiving the response set in a verification device and generating from the challenge grid and the stored pattern a verification set of symbols occupying locations in the challenge grid corresponding to the stored personal pattern;

(c) comparing the response set of symbols with the verification set of symbols; and (d) verifying the identity of the person if the response set is the same as the verification set.

Preferably, the registration step comprises first providing the person with a grid and inviting the person to select the personal pattern of locations. The invitation may be to select a pre-determined number of locations to form the personal pattern, or to select a length of pattern from one of several pre-determined numbers, for example 4, 5 or 6, or even to select as many locations as the person feels able to remember reliably, subject to a minimum number.

In one aspect of the invention, the method comprises communicating the response set to a transaction authorising computer at a location remote from the person and conducting steps (b) to (d) in said authorising computer.

According to one embodiment of the invention, step (a) comprises generating the challenge grid in a user terminal and transmitting to the authorising computer the response set of symbols and the challenge grid or data enabling the authorising computer to identify or recreate the challenge grid. Preferably this embodiment comprises using an algorithm in the user terminal to generate a pseudo-random string of symbols according to the date and/or time of day and identity data for the terminal and/or the person to construct the challenge grid, and transmitting to the authorising computer at least the response set of symbols and identity data, the authorising computer using the same algorithm and said identity data and the date and/or time of day to generate the same pseudo-random string of symbols, thereby to recreate the challenge grid.

Further security can be achieved in this method by using a second algorithm to generate from the response set and an additional identifier, for example at least one factor from:

(i) the transaction time and/or date;
(ii) a personal or account identifier;
(iii) a terminal identifier;
(iv) a public/private data key;

(v) the payment amount, in the case of a payment transaction; and (vi) all or part of the payee account number;

a token consisting of a string of symbols concealing the response set, and wherein the step (c) comprises using the recreated challenge grid to generate the verification set, applying the second algorithm using the factor or factors to generate a token from the verification set, and step (d) comprises comparing the received token with the generated token.

According to another embodiment of the invention, step (a) comprises algorithmically selecting in a user terminal one of a plurality of challenge grids previously supplied to said user terminal by a transaction authorising body or the transaction authorising computer and stored in the terminal, and transmitting to the transaction authorising computer the response set and data identifying to the authorising computer the algorithmically selected grid.

In another embodiment of the invention, step (a) comprises algorithmically selecting in a user terminal a start reference point in a large matrix of symbols previously supplied to said user terminal by a transaction authorising body or the transaction authorising computer and stored in the terminal, presenting a challenge grid derived from the large matrix using the start reference point, and then transmitting to the authorising computer the response set and the start reference point.

In a further embodiment of the invention, step (a) comprises algorithmically selecting in a user terminal a predetermined number of symbols from a large matrix of symbols previously supplied to said user terminal by a transaction authorising body or the transaction authorising computer and stored in the terminal, presenting a challenge grid of said selected symbols, and then transmitting to the authorising computer the response set, and wherein in step (b) the authorising computer applies the same algorithm to select from the large matrix previously supplied the same symbols to reconstruct the challenge grid.

In another alternative embodiment of the invention, step (a) comprises receiving in a user terminal a start reference point transmitted thereto by the authorising computer, the start reference point indicating a position in a large matrix of symbols previously supplied to said user terminal by an authorising body or the authorising computer and stored in the terminal, presenting a challenge grid derived from the large matrix using the start reference point, and then transmitting to the authorising computer the response set.

In a still further embodiment of the invention, step (a) comprises retrieving from a database of grids independent of the authorising computer an algorithmically selected one of a plurality of grids stored in said database, said grid having a unique identifier, and transmitting to the authorising computer the response set and said grid identifier, and step (c) comprises the authorising computer transmitting the identifier to the independent database to retrieve the challenge grid.

Access to a computer or other equipment could be controlled according to the method of the invention.

The grid may be pre-printed with a plurality of symbols in respective grid positions In one embodiment, the invention comprises a method for identity verification or 'service entitlement' which may (but is not necessarily a requirement) be used in conjunction with a device for recording securely any codes or PINs or the like. In particular, the present invention may be used in concert with the 'Craymer Grid', which is the subject of co-pending Patent application No GB0517333.1.

The Craymer Grid is a device for the secure storage of information and comprises a first member having a first surface, a second member having a second surface, the first and second members being moveable relative to one another to a selected position, the first surface having at least one window therein so that parts of the second surface are visible through the at least one window, and the first and second surfaces are provided with grid markings into which a user may write indicia, such that predetermined indicia on the second surface are only visible through the at least one window when the first and second members are in the selected position. The device may be in the form of a flat sleeve containing a slidable member marked with an empty grid pattern onto which the user may enter one or more PIN codes or other security digits, letters or both. When this is done, the user can fill the remaining grid positions with random digits, letters etc. When the user wants to use a particular PIN code (say) he/she moves the member inside the sleeve until the desired code appears in the window. Only the user knows what that position is. The user may mark the grid in a secure way to remind himself what the 'start position' is to enable the user to read the proper code.

It will be understood that the use of the term "grid" herein encompasses not only regular grids as hereinafter described with reference to the drawings, but also irregular arrangements of locations. For example, locations on the "grid" could be represented by different elements of a picture, and the spacing of one location relative to any other does not need to be uniform, either in distance or direction.

Alternatively, the invention may use virtual grids held on credit or debit (or other personally-identifying) card chips, i.e. the virtual grid is represented by data that can be expressed to the user as a grid by a card reading device. These may be read at an EPOS or by a dedicated card reader or a telephone, such as a mobile phone, which may be fitted with a card reader, or any other suitable electronic device. The grids may alternatively be held (as virtual grids) on the telephone. An EPOS may generate its own grid. The user's chosen pattern could be securely saved on the card chip, for example.

Alternatively, the invention may use grids that are generated automatically by the authenticator, with the verification made by comparing the user's response to a pre-registered pattern that the authenticator has securely encoded on to the user's credit/debit card chip or other identity or entitlement device.

The method of the present invention requires that the party (authenticator) who is wishing to make the verification (e.g. credit/debit card company) issues a challenge to the user (e.g. purchaser) for a set of numbers (authentication code) based on a grid that the authenticator generates or by a 'grid reference' specified by the authenticator.

The user then uses a grid of numbers which is also known by the authenticator (e.g. Craymer Grid or an on-line grid presented on-screen which has been generated by the authenticator) and picks a set of numbers according to a pattern or 'shape' known only by himself and the authenticator and then communicates these numbers back to the authenticator.

Since the authenticator also knows the grid numbers and the user's known sequence and pattern he can also look up the same sequence and pattern of numbers and, if they match, they have a positive verification.

Since the authenticator may ask for a sequence and pattern of numbers based on a random home or grid-reference, subsequent transactions are likely to require that the user start from a different grid reference position. This will mean that on subsequent transactions a different authentication code will be required. (This situation will typically arise when a user is using an off-line, rather than an on-line, grid.)

It will be understood that references to a "set of numbers" and the like include symbols other than Arabic numerals.

The verification device may be an electronic device carried by the user, for example an electronic chip incorporated into a transaction or identification card.

According to one aspect of the invention, the verification device will be an access control computer controlling access to a building or other location, or to a piece of machinery or vehicle.

The invention also provides apparatus for use in verifying a person's identity, comprising means for receiving and storing identification data for the person and a linked pattern of locations on a grid, electronic means at the person's location for presenting to the person a challenge grid and an invitation to the person to identify in response thereto a response set of symbols occupying locations in the challenge grid corresponding to the stored personal pattern, and verification means for receiving from the person the response set, the verification means being arranged to generate from the challenge grid and the stored pattern a verification set of symbols occupying locations in the challenge grid corresponding to the stored personal pattern, to compare the response set of symbols with the verification set of symbols, and to verify the identity of the person if the response set is the same as the verification set.

The verification means may comprise a transaction authorising computer.

The electronic means is suitably a user terminal remote from the transaction authorising computer.

In one embodiment of the invention, the user terminal is programmed to generate the challenge grid, and arranged to transmit to the transaction authorising computer at a location remote from said user terminal the response set and the challenge grid or data enabling the transaction authorising computer to identify or recreate the challenge grid.

In another embodiment, the user terminal is programmed to use an algorithm to generate a pseudo-random string of symbols according to the date and/or time of day and identity data for the terminal and/or the person to construct the challenge grid, and arranged to transmit to the transaction authorising computer at least the identity data, and wherein the transaction authorising computer is programmed to use said identity data and the date/time of day to generate, using the same algorithm, the same pseudo-random string of symbols, thereby to recreate the challenge grid.

The user terminal may further be programmed to use a second algorithm to generate from the response set and an additional identifier, for example at least one factor from:

(i) the transaction time and/or date;
(ii) a personal or account identifier;
(iii) a terminal identifier;
(iv) a public/private data key;
(v) the payment amount, in the case of a payment transaction; and
(vi) all or part of the payee account number;

a token consisting of a string of symbols concealing the response set, and the transaction authorising computer is programmed to use the recreated challenge grid to generate the verification set of symbols, to apply the second algorithm using the factor or factors to generate a token from the verification set, and then comparing the received token with the generated token to establish or deny verification.

In another embodiment, the user terminal is programmed to select algorithmically one of a plurality of challenge grids previously supplied to said user terminal and stored therein, and arranged to transmit to the authorising computer the response set and data identifying the selected grid.

In yet another embodiment, the user terminal is programmed to select algorithmically a start reference point in a large matrix of symbols previously supplied to said user terminal and stored therein, to present a challenge grid derived from the large matrix using the start reference point, and then to transmit to the authorising computer the identified symbols and the start reference point.

In another embodiment, wherein the user terminal is programmed to select algorithmically a predetermined number of symbols from a large matrix of symbols previously supplied to said user terminal by a transaction authorising body or the transaction authorising computer and stored in the terminal, to present a challenge grid of said selected symbols, and then to transmit to the authorising computer the response set, and wherein the authorising computer is programmed to apply the same algorithm to select from the large matrix previously supplied the same symbols to reconstruct the challenge grid.

In a further embodiment, the user terminal is programmed to receive a start reference point transmitted thereto by the verification computer, the start reference point indicating a position in a large matrix of symbols previously supplied to said user terminal and stored therein, to present a challenge grid derived from the large matrix using the start reference point, and then to transmit to the transaction authorising computer at a location remote from the user terminal the identified symbols.

In a still further embodiment, the user terminal is programmed to retrieve from a database of grids independent of the transaction authorising computer and of the person an algorithmically selected one of a plurality of grids stored in said database, said grid having a unique identifier, and to transmit to the transaction authorising computer at a location remote from the user terminal the identified symbols and said grid identifier, and wherein the transaction authorising computer is programmed to transmit the identifier to the independent database to retrieve the challenge grid.

The user terminal may be an automated teller machine (ATM). Alternatively, the user terminal is a computer connectable to the authorising computer via a network connection, or a portable electronic device connectable to the authorising computer through a wireless connection.

In the case where the challenge grid is calculated algorithmically, the user's device can be completely separate from the authentication computer. In this case, the verification symbols may, for example, be communicated verbally to a third party telesales operator who completes the verification step, or via voice recognition software.

Advantages of the invention include the following:

People find it difficult to remember PINs. However, the human mind is much better at remembering shapes and patterns. This method eliminates the need to remember PINs. This provides a higher degree of security than exists at present whilst providing the user with a simpler way of remembering their authentication means.

Due to the randomness of the grid challenge, the correct authentication code will change on subsequent transactions. Therefore in the case of a credit card purchase, if someone sees the user entering a transaction code and subsequently steals the credit/debit card then the PIN/credit card will be useless to him unless he knows the user's chosen 'sequence' and 'pattern'.

People often compromise the security of their credit/debit cards by writing down their PINs. The abstract nature of patterns proposed in the method of this invention makes it more difficult for the pattern to be written down or 'described'.

Since the transaction codes change on a per-transaction basis it is possible to make relatively secure on-line transactions over the internet or over the telephone. Transaction verification may also be made using a portable electronic device, particularly a communications device such as a 'smart' telephone, i.e. a mobile telephone equipped with a card reader, or a less capable mobile telephone, as will be described later in this specification.

Most authentication systems ask for a four digit PIN. However, since people find patterns easier to remember than numbers, it is possible to introduce 5, 6 or more digit authentication codes without undue problems for the user.

The method could potentially be used without any additional hardware infrastructure at Point of Sale terminals, for on-line web purchases or at ATMs. Such terminals may be provided by smart telephones, as described later. It is envisaged that existing 'Chip and Pin' hardware could be used albeit with some minimal software reprogramming.

For credit/debit card purchases, more than one credit/debit card could be registered for use with a number grid.

The process is easily learnt and does not require a high degree of sophistication on behalf of the user.

Braille systems could easily be produced for sight-impaired people.

For on-line or other electronic purchases, no additional hardware is required by the user. For other situations where a paper-based grid is required, the user hardware required is cheap to produce and is of little or no value if stolen.

The security is only compromised if a third party knows the 'sequence' and the 'pattern' A casual or even a malevolent observer would not easily ascertain it.

Importantly, the system does not at any stage transmit the actual personal pattern, nor does it use that pattern in the construction of the challenge grid, and so the risk of this being intercepted and misused by a third party is avoided. Furthermore, the system enables an authorisation for a transaction, for example in an ATM or POS machine, to be obtained securely with a single short connection to the authorising computer, keeping communication costs to a minimum and increasing security for the communication. This is particularly important where the communication is made with the authorising computer via a modem and dial-up connection, which is currently the standard method. Each resulting telephone call may involve a cost, as well as taking time to establish the connection, and telephone calls are also commonly charged for according to the duration of the call, so remaining connected for the duration of the transaction could substantially increase costs, especially when some users are slower in completing transactions than others.

While the invention is important for authenticating individuals to an organisation such as a bank, it also provides the possibility of the bank or other organisation proving its authenticity to the user. This might be important to overcome the fraudulent technique known as "phishing", where people are induced to disclose confidential account information through fake bank internet sites, this information then being used to steal money from the individual's bank account. In order to demonstrate to the user that a bank internet site is genuine, it would be possible to use the two secret pieces of information shared by the bank and the user, under the method of the invention, namely a standard PIN and the user's secret pattern. Before disclosing any confidential data (such as a login password) on the bank internet site, the user needs reassurance that the site is genuine. This could be provided by the bank's site displaying, in response, say, to the user's name being entered, a grid full of random (or at least pseudo-random) numbers, except that the user's PIN is displayed in the user's secret pattern positions. The user can check that these are correct before proceeding with the usual security input to gain access to the site.

Other possibilities are for the grid with the hidden PIN to be supplied in printed form, for example authenticating a mailshot letter, or on an electronic communication such as an e-mail message, to enable the recipient to confirm that the sender is genuine.

BRIEF DESCRIPTION OF THE DRAWINGS

The invention will be described with reference to the accompanying drawings, of which:

FIGS. 1 to 3 illustrate a grid and different methods of using the grid in accordance with the invention;

FIG. 4 illustrates a variation on the grid;

DETAILED DESCRIPTION OF THE ILLUSTRATED EMBODIMENTS

Figure 1:
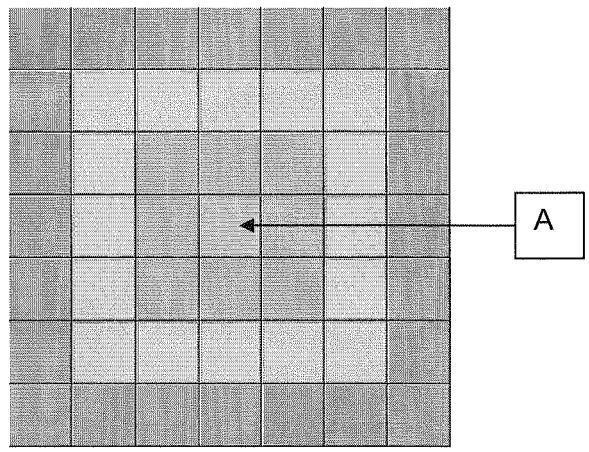

As an aid to understanding the following description, we use the following terms:

'Grid'—A tabulated set of symbols, such as numbers or letters or a combination of both. This grid may be (but need not necessarily be) represented on a 'Craymer Grid' forming the subject of our above referenced co-pending patent application.

'Pattern'—A choice of grid positions which make up a 'pattern' which is only known by the user of the grid and the authenticator (see below). A pattern is not necessarily a naturally recognisable shape such as a straight line, square or triangle. Indeed, it is preferable for it not to be a regular shape.

'Sequence'—The order in which the grid positions in a 'pattern' are selected.

'Authenticator'—A person or organisation who wishes to check someone's identity or entitlement.

'User'—A person or organisation that is using the system and needs to validate his/its own identity or credentials.

OPERATION OF THE METHOD

The method in accordance with the invention comprises the following component stages, which are dependent on whether the user uses the method electronically (e.g. by telephone or on-line) or manually (e.g. using a paper grid made available to the user).

1. Registration (including the following three actions):
   A. Issuing of hand-held grids (which is not necessary for on-line authentication)
   B. Registering the hand-held grid (which is not necessary for on-line authentication)
   C. Registering a sequence and pattern (which is required for both hand-held grids and on-line authentication)
2. Using the system with a hand-held grid.
OR
3. Using the system with an electronic grid (e.g. for on-line purchases or at an ATM).

The various stages will now be described in more detail.

1. Registration a. Issuing Grids

When using the hand-held version of the method, it is necessary that a pre-printed grid be issued to the user. For large scale use (e.g. by a credit/debit card company), they may choose to print many millions of different grids in order to reduce the chances of two people having the same grid. It is not necessary that each person has a unique grid; however, the more variations of a grid there are the more the security is enhanced. The grids will need to display row and column identifiers for example letters for columns and numbers for rows. The identifiers could alternatively or additionally be symbols, colours, or combinations of these.

The grids are of the same size and format as one another but the arrangement of symbols (digits, letters etc) will vary from one grid to the other. However, it is possible for the method to operate successfully and securely if the same symbols are printed on every grid because each user will select a different pattern and sequence for his own identity or entitlement.

Each grid will carry an identification code which will uniquely identify the grid. This ID would be stored in a secure computer database along with the user's details and an electronic copy of the grid's numbers. The identification number should not in any way give any clues as to the numbers on the grid.

b. Registering Hand-Held Grids

Users will be required to acknowledge that they have received the Grid and to register the grid as belonging to them. Each card issuer (e.g. bank) will have its own preferred method of issuing the grids and identifying the end-user depending upon their desired level of security. Examples of how this could be done include face-to-face registration, On-line registration or Automated Telephone registration.

A card issuing agency could be a trusted authentication agency to which many organisations could subscribe. For example a trusted agency could represent several credit card companies.

Registering a Pattern/Sequence

Once the identity of the user is known to the authenticator the user will need to register his own personal 'sequence and pattern'. This will be a key or 'shared secret' which only the user and authenticator will know.

A specific method for registering a pattern on-line is shown in FIG. 1. The user is presented with a grid of squares. FIG. 1 shows a 7×7 grid which will provide a good degree of security for such things as credit card purchases. However, the grid could be made larger for greater security or smaller for lesser security, but greater convenience of use.

The centre of the grid (a), FIG. 1, is known as the 'home' or 'grid reference point' around which the user will need to select their pattern. The grid may be marked in colour to make it easier for the user to navigate around the grid but colours or shading, etc., are not necessary.

The user would normally be asked by the authenticator to create a pattern of four positions, i.e. the equivalent security level of a standard PIN. Assuming that this process is being conducted electronically, the user would click on the appropriate squares in sequence. As he does so the selected squares could be illustrated, e.g. by illumination, the appearance of the symbol itself, or perhaps by a single symbol, such as a * in each position. (The user may be asked for more or fewer grid positions depending upon the degree of security required).

The example shown here shows that the chosen pattern sequence is (1) diagonally above and to the left of the grid reference point. The second position (2) is to the left of the reference point, the third (3) is to the left of the second and the fourth (4) is below the second. It will, of course, be critical to authentication in most applications that the correct pattern is described in the right sequence. This is of course no different to requiring the characters of a PIN to be entered in the proper sequence, otherwise the incorrect sequence will be rejected, even though the characters may be the same. It should be pointed out, however, that a low-security application could be based on identification of the correct pattern without regard to the sequence.

When choosing a pattern the user should be encouraged to be as 'devious' as possible and should be discouraged (and potentially prohibited) from picking straight lines or other obvious shapes. Similarly, they should not necessarily believe that they have to use the grid reference point in their selection. The pattern can be anywhere on the grid, and the individual elements of the pattern need not be adjacent to each other or even in the same region of the grid. In essence, the more obscure the pattern, the more secure their pattern will be. There is no reason why a square could not be chosen more than once. However, from a security perspective, it is unlikely that an authenticator would want to allow the user to select the same number four times, for example.

Clearly on a 7×7 grid there are a multitude of possible patterns that a user can select. It is informative to note that there are approximately 5.7 million patterns for a 4-position code rising to approximately 282.5 million for a 5-position code. The grid positions chosen by the user need not be touching, either along sides or at corners.

If the user is registering a standard 'Craymer Grid' then they will additionally need to enter their selected 'start position' and the preferred card side (grey or black). This becomes part of the key or 'shared secret' between user and authenticator.

If the system is being used in conjunction with, for example, a credit/debit card, the authenticator may at this stage want to associate the card with the person's registration. This will be necessary in instances where the user may want to make 'Card not present' purchases. This could be done by swiping the card or by doing a standard chip and pin authentication to associate the card number with the user.

As well as an 'on-line' method of registering a pattern, it is also possible to register by telephone or verbally by giving each grid position a number from say 1 to 49 (for a 7×7 grid). The precise method used will be dependent on the desired level of security. For example, a bank may require a person use their e-banking facility to register a sequence and pattern or to go in person to the branch to enter it.

An alternative approach in the registration of the pattern would be for the authenticator to fill the registration grid with non-repeating characters arranged randomly. For example, for a 5×5 grid, the letters A to Y could be used with no repeats. The user can then indicate to the authenticator his chosen pattern by entering the letters in the chosen squares. As these are non-repeating, the authenticator can readily identify the pattern/sequence.

2. Using the System with a Hand-Held Grid (e.g. Craymer Grid)

To use the grid it is necessary that the grid be registered to a user and that the user has registered a pattern and (usually) sequence with the registration agency (authenticator, credit/debit card company etc) as just described.

To illustrate the process, an over-the-counter credit card purchase will be used as an example, in which the following steps occur:

a) The customer selects some goods and goes to the store checkout to pay for them by credit/debit card as normal.

b) He hands over his card as normal and it is placed in a 'Chip and PIN' device.

c) Instead of being asked for a PIN, he is asked to enter four digits corresponding to a randomly selected grid reference (e.g. G4) on his previously registered grid. The home or grid reference position is randomly or algorithmically chosen by the credit card agency.

d) A typical grid is shown in FIG. 4, consisting of columns identified by letters A to Q and rows identified by numbers 1 to 12. Of course, other combinations are equally acceptable. The number of rows and/or columns can be varied according to the desired level of security. A grid position can therefore be located by a unique number/letter combination. However, a 'Craymer Grid' could provide a higher level of security.

e) Using the example above and the example pattern shown during the registration process (FIG. 2), the user would find grid position G4 (in this case the number 0) and use this as his grid reference point.

f) Having found position G4 and remembering his sequence and pattern, the user will enter the four digits that he sees associated with his pre-registered pattern. (See FIG. 2). So, in this example the numbers will be "9846".

g) He will then enter those four digits onto the 'chip and pin' keypad.

h) The credit card company's computer system will then check those four digits against the grid associated with his credit card and with the pre-selected sequence and pattern.

i) If these digits match, then the user is verified and the transaction is completed.

The next time the user makes a purchase, the credit card agency will randomly or algorithmically pick a new 'grid reference' position, and therefore the four digit code required to authenticate the transaction will be different. For example on the next transaction the user may be asked for a number corresponding to "K9" then the valid code would be "9047".

It is not entirely necessary that the person uses his own grid for the transaction. He could use any registered grid (e.g. a grid registered to the shopkeeper or to a friend). In this case the alternative grid ID will need to be entered at the point of sale prior to the user entering his transaction code. This variation to the process means that the user can still use the system without the need to carry his own card. This has particular advantages if for example a person has his credit card and grid card stolen. In this situation the user could telephone the authentication agency and identify himself by, for example name and address, and then the agency asks for authentication by use of a third party's grid.

Whilst this does not provide the same high level of security, in the absence of any other form of identification it is better than nothing. It could therefore be used adequately for example in 'low value' transactions where there is a low risk.

There now follows a description of a further example of how the invention can be used to buy goods or services, e.g. theatre tickets, over the telephone.

The user will speak to the booking agent who will then ask for the credit card number. The agent will then validate the credit card and then the credit card company will ask the operator to ask the customer to provide a transaction code based on a grid reference that the credit card company specifies.

The agent will then ask the user for the transaction code over the telephone, the user will then find the transaction code numbers using his grid and read them out to the agent.

The agent will then enter the numbers and the credit/debit card agency will either accept or reject the transaction.

This process is far more secure than exists at present as it does not require the booking agent to be trusted. Even if the agent remembers the transaction code and credit card number it will serve no useful benefit to him if he fraudulently tries to make another transaction because next time a different transaction code will be asked for.

This method will also be of use to disabled people who have a carer, for example a stroke patient who may have difficulty speaking on the telephone or using a chip and PIN keypad, but who could use the grid. In this way, the disabled user could tell the carer the transaction code, and this could be safely communicated to the company concerned by telephone or typed in. So long as the disabled user keeps his grid and pattern safe, his transactions are secure.

3. Using the System with an Electronic Grid (e.g. for On-Line Purchases Over the Web, at an ATM or at a Point of Sale Terminal)

For on-line authentication (e.g. on-line purchases) there are three variants of how the invention could be used. The choice of method is very much dependent upon the perceived security risk and desired level of convenience.

The three methods are:

By using a registered paper grid as illustrated in the example above.

By using an electronic 'one-time' grid in the same form as shown above (FIG. 4) or by using an electronic "Craymer Grid"

By using a simplified 'one-time' electronic grid in the form illustrated in FIG. 3.

In such an instance as this, the user would be shown a grid in the form shown in FIG. 3. However, the numbers displayed will be algorithmically generated by the authentication system. The authentication system will secretly 'remember' the grid numbers until the transaction is complete.

The user will then select his number pattern by either clicking on the appropriate squares, touching a touch screen, or preferably by entering the associated numbers on the keypad, since someone looking over his shoulder might be able to see the pattern being entered, and similarly, it might be possible for the clicking on the squares to be monitored illegally remotely. Entering the numbers does not give away the pattern, because the same number will represent many different patterns. The only time someone should be allowed to click on squares connected with the pattern is when they are registering the pattern, and it is expected that the user will do this safely.

Figure 2:
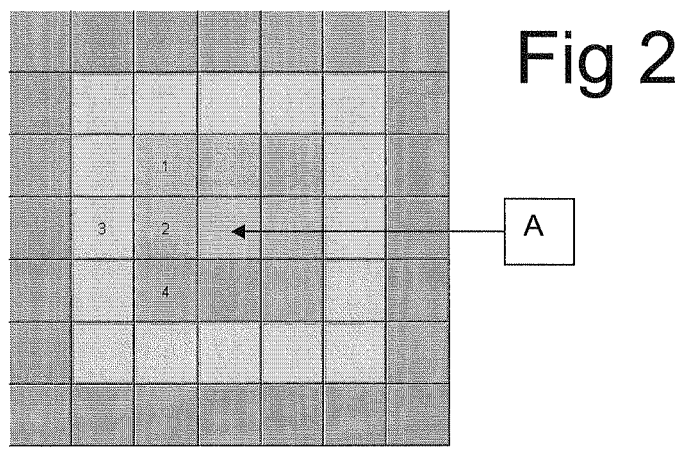

Using the example from FIG. 2, the authentication code in this instance would be "5178". Once entered, the authenticator will then check the digits entered against its known pattern and sequence and, if they match, the user is authenticated.

There are various advantages in using an electronic grid in this form:

a. Anyone eavesdropping the keystrokes on the computer will see the digits being entered but since the transaction code is 'one-time' this will not benefit him for any further transactions.
b. Even if an eavesdropper can detect the numbers on the screen (which may be very difficult if the numbers are displayed as a graphic) then he still may not be able to determine the user's 'sequence and pattern' even if the eavesdropper detects the keystrokes. Since in this example the digits "5178" appear multiple times in the example grid, the eavesdropper would potentially need to observe several transactions in order to obtain enough 'clues' by which he can determine the pattern.
c. Clearly, the more devious the user at selecting a pattern, the more difficult it would be for any eavesdropper to determine the pattern.

Using the System with Mobile Telephones

The present invention may be used with mobile telephones in a variety of ways, depending on whether or not the mobile telephone is provided with a card-reading capability (i.e. a 'smart phone').

Where the phone incorporates a card reader, essentially it becomes a personal EPOS system in itself. First, the user would insert his/her card into the phone (just like EPOS terminals in shops). The authenticating computer would then send a 7×7 (for example, or 5×5) grid to the screen of the phone. The user would, using the system of pattern and sequence central to the present invention, identify the digits required by the authenticating computer to answer its challenge, and input them into the mobile phone key-pad, completing the transaction authentication.

For less-capable mobile phones a software application would be written and securely downloaded onto the phone (in the same way as perhaps a ring tone) that would store a number of virtual grids of numbers. In a similar fashion to the paper grid, the authentication system would challenge the user with a grid reference, but instead of something like 'G4' it would make the challenge with a grid number e.g. "234". The user will type 234 into his phone and the phone would then display the standard grid of the type described with reference to FIG. 3 on the LCD display. The user would then use this in exactly the same way as the online system. The credit/debit card-issuing company could automatically provide the user with a new set of grids via GPRS or SMS on a periodic basis, say weekly or monthly.

Alternatively, the mobile telephone could generate a challenge grid algorithmically and therefore independently of the authenticating computer.

It should be emphasised here that the current preferred form of the system of the invention depends on a unique combination of pattern and sequence, providing a personal identification pattern (PIP) unique to an individual user.

Figure 5:
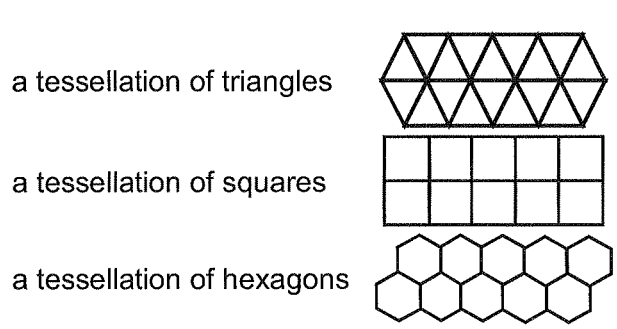
FIG. 5 illustrates a variety of tessellations that could be used for the grid.
Figure 5:
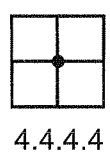
Figure 5:
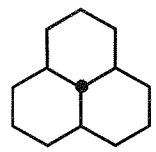
Figure 5:
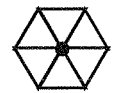
Figure 5:
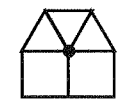
Figure 5:
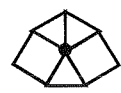
Figure 5:
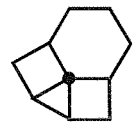
Figure 5:
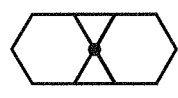
Figure 5:
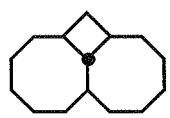
Figure 5:
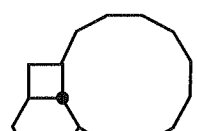

Further, it should also be emphasised that the use of grids containing only squares or rectangles, as disclosed so far, is not the only option. In fact, any tessellated shapes may be used. Thus, a regular polygon has 3 or 4 or 5 or more sides and angles, all equal. A regular tessellation is a tessellation made up of congruent regular polygons. For all practical purposes, only three regular polygons tessellate in the Euclidean plane, namely triangles, squares and hexagons. FIG. 5 shows examples of tessellated triangles, squares and hexagons. It can readily be seen from these examples that the squares are lined up with each other while the triangles and hexagons are not. Also, if six triangles form a hexagon, the tiling of triangles and the tiling of hexagons are similar and they cannot be formed by directly lining up shapes under one another—a slide (or a glide) is involved. Being regular shapes, they could readily be used as a reference grid for a user to select his or her unique pattern and sequence.

There is a naming scheme by which tessellations are identified. Thus, a tessellation of squares is named "4.4.4.4". This is derived by selecting a vertex and then looking at one of the polygons that touches that vertex and deciding how many sides it has. Since it is a square, it has four sides, leading to the first "4". Repeating the exercise by going around the vertex in either direction, and finding the number of sides of the polygons until you get back to the polygon you started with leads to a count of the number of polygons counted. In the case of squares, there are four polygons and each has four sides. The final "name" is therefore 4.4.4.4, as shown in FIG. 5.

The identification for a tessellation of regular congruent hexagons is 6.6.6 and that for a tessellation of triangles is 3.3.3.3.3.3, since each triangle has six polygons surrounding a vertex and each has three sides. However, the invention also contemplates the use of semi-regular tessellations, which consist of a formation of regular polygons with an identical arrangement of regular polygons at every vertex. Examples of semi-regular tessellations are shown in FIG. 5, using a mixture of squares and triangles (3.3.3.4.4 or 3.3.4.3.4), squares, triangles and hexagons (3.4.6.4); triangles and hexagons (3.6.3.6); squares and octagons (4.8.8) and more unusual combinations of squares, hexagons and dodecahedrons (4.6.12).

An incidental advantage of using such tessellations is that each grid pattern can then be identified using the unique naming scheme for tessellations before the user's own pattern and sequence are challenged. This adds another level of security to the system if desired.

Security Considerations

1. The system forming the invention consists of several components
    a. A grid of numbers known by both the user and the Authenticator
    b. If using the 'Craymer Grid' then, in addition to the numbers, the card orientation and the 'start position' must be known by both the user and the Authenticator.
    c. A 'sequence' and 'pattern' which must be known ONLY by both the user and the authenticator.
2. If the grid is stolen then security is not compromised because the pattern and sequence are both required to make a successful authentication.
3. In the case of purchases, if both a credit/debit card and a grid are stolen, then the security is not compromised because the sequence and pattern are both required to make a successful authentication.
4. In the case of paper grids such as the Craymer Grid, if the pattern is known by a third party then (depending upon the required degree of security) the grid will also need to be stolen or copied. The authenticator will need to take this risk into account before he decides whether he allows third party grids to be used.
5. Depending on the desired level of security, the user could be barred from registering easily recognised patterns, e.g. straight lines. The authenticator could implement software rules to allow only 'obscure' patterns to be selected.
6. It may be thought preferable to use letters (A-Z) instead of, or as well as, numbers in order to increase the 'uniqueness' of the transaction code. However, it must be considered that the more unique the number the more clues a potential eavesdropper would have to determine the pattern. For greater security the authenticator may consider that a five or six digit numeric code would be more secure than for example a four character alphanumeric code.

7. In any transaction (for example in a shop), the user should not tell the shopkeeper the transaction code and the 'start grid reference' and show him the grid, if he does then it may be possible (although not absolutely possible) for the shopkeeper to determine the pattern. The more pieces of information that the user can keep private, the better.

8. For electronic transactions the software should be written such that the grid numbers, the pattern key, the grid start reference and the user's personal information are not transmitted in one data set as this would provide valuable clues as to the user's pattern. Instead, the minimal amount of data should be sent. For example the grid squares could be displayed as a graphic rather than as a set of ASCII characters.

9. All electronic transmissions should ideally be encrypted.

10. Authentication data (e.g. the transaction code) should only be transmitted for authentication with an obscure identifier that identifies the sale. No other data should be transmitted which could give clues as to the grid numbers or pattern.

Various specific embodiments of the method and apparatus of the invention will now be described with reference to FIGS. 6 to 12.

Figure 6:
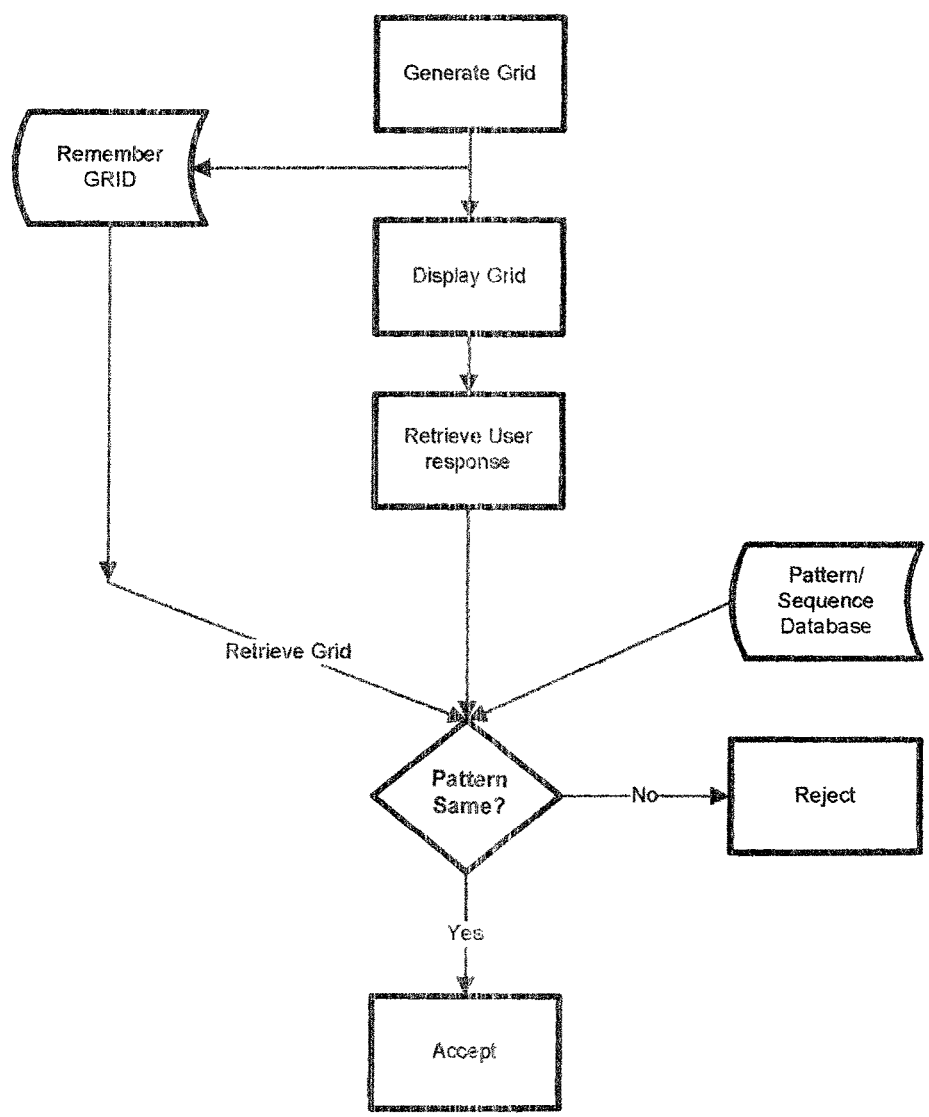
FIG. 6 is a flow chart illustrating a method for online verification according to one embodiment of the invention.

Referring first to FIG. 6, an on-line verification method according to the invention involves generation of a challenge grid in the user terminal, which may be an ATM or the user's computer, as described hereinafter with reference to FIG. 10, or the user's portable electronic device, such as the cellular telephone-based system described hereinafter with reference to FIG. 12.

The grid may be generated by an algorithmic or pseudo-random number-generating process. Such systems are well-known, and need not therefore be described in detail. The number generation cannot be purely random, because this would theoretically give rise to the possibility of the grid being filled with long strings of the same number, so that the verification string could then be all the same number. If any number appears in the grid more than the average number of times, it is more likely than others to be part of the user's pattern, and could therefore assist a thief in guessing the correct sequence of numbers. While the chances of a correct guess are very small, the risk of guessing correctly will be minimised by ensuring that all numbers in a 5×5 grid appear at least twice, but no more than three times. It may be desirable to use a grid in which all digits can appear with the same frequency. For example, a 5×6 grid has 30 cells, and therefore each digit can appear exactly three times, minimising the probability of someone guessing the correct string of digits. This may be referred to as a balanced grid.

It will be understood, therefore, that references herein to "pseudo-random", "algorithm" and "algorithmically" indicate processes where the appearance of randomness is created in the result, but the result is not purely random, and the process may incorporate encoding rules based, for example, on additional data. One of the factors employed in an algorithm, for example, could be a public/private data key.

The generated challenge grid is held in memory on the terminal while being displayed with the challenge to the user to enter the numbers occupying the locations in the grid corresponding to the user's chosen pattern (and sequence). The user's response is then transmitted to the authenticator along with the stored grid, for comparison with the user's pattern stored in the authentication database. If the verification set of numbers corresponds with the numbers in the transmitted challenge grid identified by reference to the user's stored pattern, the verification is accepted, otherwise it is rejected.

Figure 7:
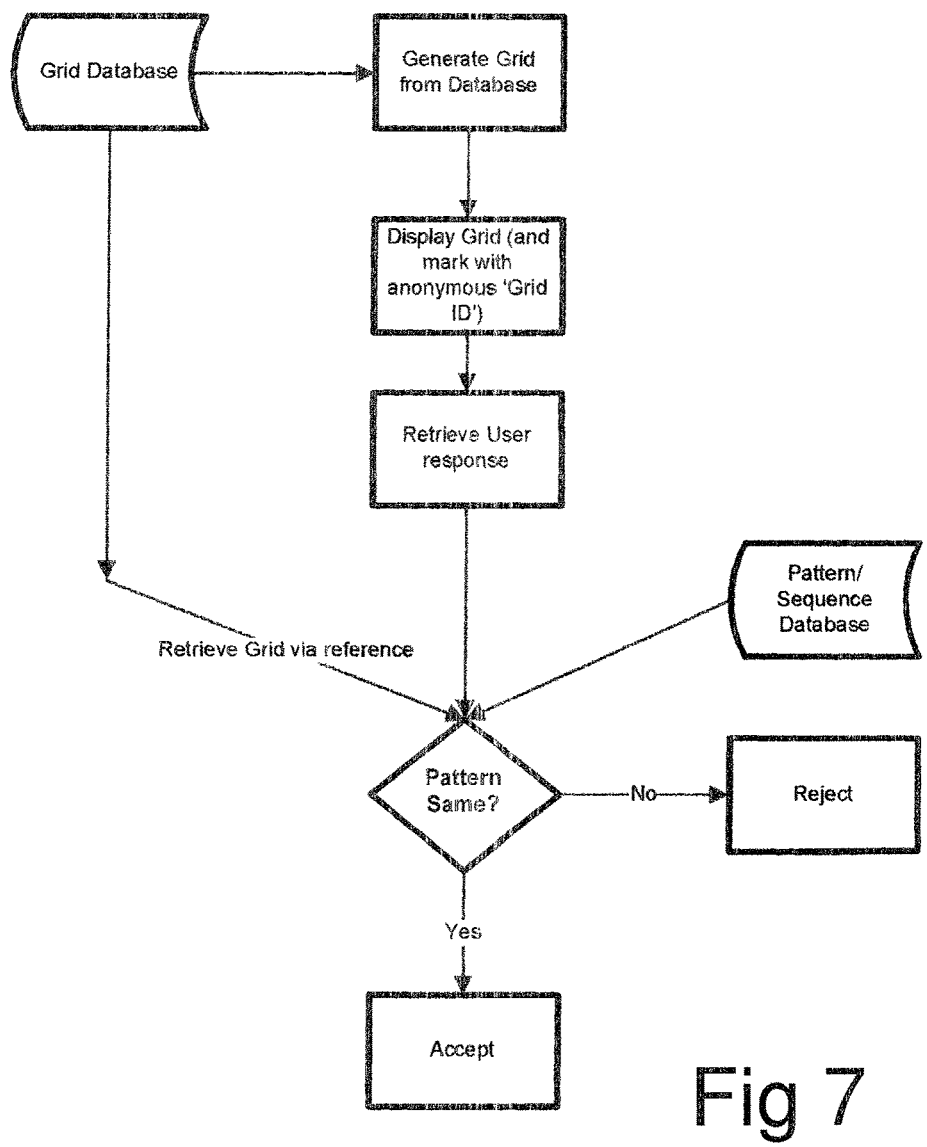
FIG. 7 is a flow chart illustrating a method for online verification using an external database of standard challenge grids.

It will be seen that the user's secret personal pattern is not transmitted outside the authenticating computer. However, while the data transmitted from the user terminal to the authenticator would be encrypted, if a hacker were to intercept and decrypt this, he would have access to a clue to the user's personal pattern by referring the string to the grid. The method illustrated in FIG. 7 provides one way of avoiding this possible weakness. At the start of the transaction, the user terminal contacts a separate grid database which supplies to the terminal a challenge grid algorithmically selected from a large number of grids stored in the database. The challenge grid carries a unique identification code. The transaction proceeds in essentially the same way as in the method illustrated in FIG. 6, except that the challenge grid is not transmitted to the authenticator; instead, the grid identification code is sent, and this is used by the authenticator to retrieve the grid from the separate grid database for the comparison step.

Figure 8:
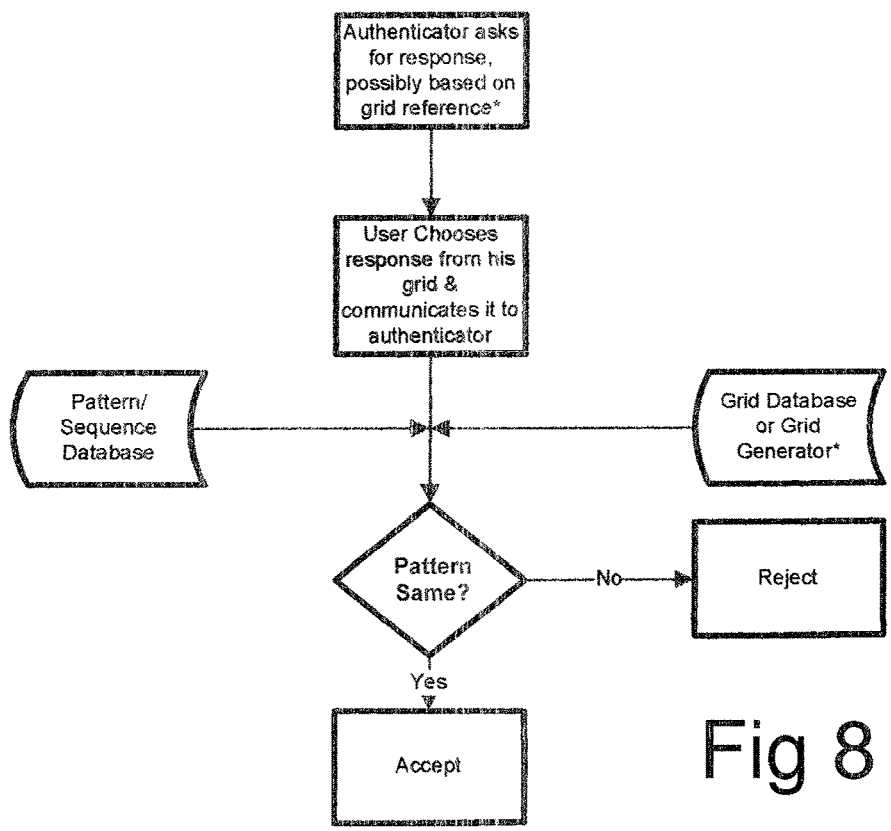
FIG. 8 is a flow chart illustrating a method for verification where a single large grid is employed, the user being directed to a particular location on the grid as a starting reference point.

In the method illustrated by FIG. 8, the authenticator initially supplies to the user a large grid of numbers, the grid being substantially larger than the challenge grid used for the transaction (which is typically a 5×5 grid or a 7×7 grid). The supply of a fresh large grid may be carried out at regular intervals, perhaps automatically, to the terminal, and the grid used is stored in a grid database by the authenticator for reference. At the start of the transaction the authenticator specifies to the user a pseudo-randomly generated grid reference which serves as a starting point for the terminal to extract from the larger grid the challenge grid. For example, a 5×5 grid may be extracted using the grid reference as the top left-hand corner. The user terminal then needs only to transmit to the authenticator the numerals entered by the user in response to the challenge for the verification comparison to be carried out by the authenticator.

It will be understood that, while each of these methods is described with reference only to the transmission of the numerals entered by the user, with other grid identifiers where necessary, these will necessarily be accompanied by some account number or other personal identifier to be verified.

In an adaptation of the method illustrated in FIG. 8, the user terminal selects the grid reference start point pseudo-randomly itself at the start of the transaction, and this is transmitted along with the user's challenge numerals to the authenticator, who can then find the challenge grid from the stored grid for the user terminal.

In another adaptation of this method, the user terminal employs a simple algorithm to generate from the large grid of, say, 1000 numbers a challenge grid of, say, 25 numbers which are not a discrete contiguous sub-set of the larger grid. This method has the advantage that the algorithm does not need to be totally secure. For example, the user could be sent a virtual larger grid of numbers once a month by the authenticator. Since the authenticator knows both the algorithm and the virtual grid, it can work out what numbers to expect. If, however, the algorithm becomes known, the hacker would not have access to the virtual grid, which would be different for each person and would be changed regularly. So while at worst the hacker might know the grid positions in the virtual grid which would be used to generate the challenge grid, he will not know the numbers occupying the particular virtual grid, and can therefore not generate the challenge grid.

In a further adaptation, instead of one large grid, the user terminal is supplied with a plurality of challenge grids by the authenticator in the same manner as for the large grid, each grid carrying an identifier. The authenticator could then indicate to the user terminal at the start of the transaction the grid to be used, by transmitting the relevant identifier, or the user terminal could algorithmically select one of the grids and send its identifier along with the numerals entered as a result of the challenge.

Figure 9:
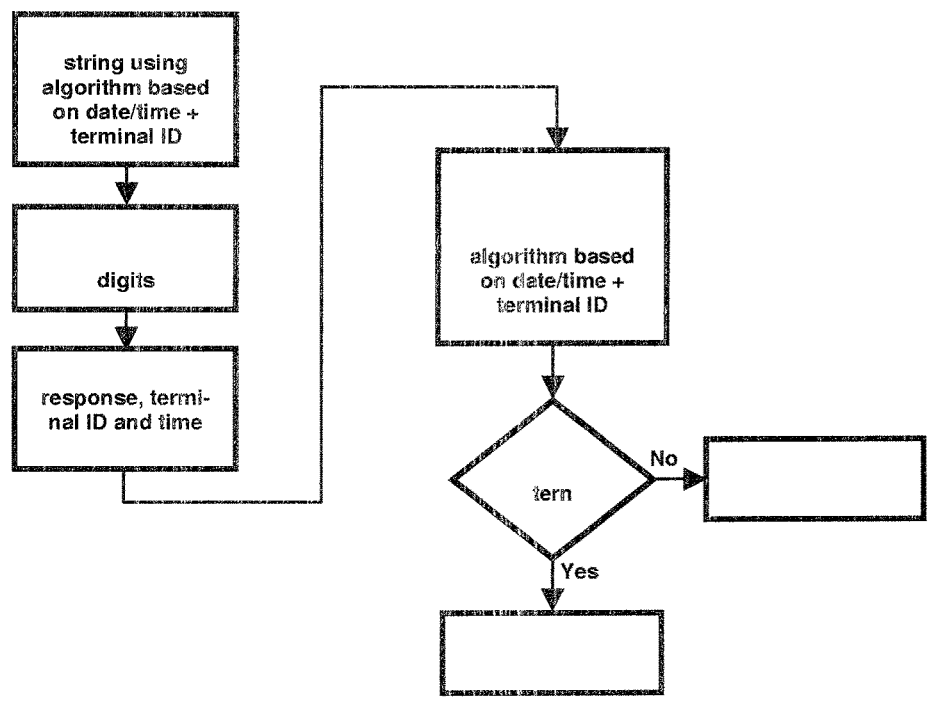
FIG. 9 is a flow chart illustrating a method for verification using a grid generated locally by a time-dependent algorithm.

FIG. 9 illustrates yet another approach. The local terminal is arranged to run an algorithm at the start of the transaction which uses the date and time of day and a terminal and/or personal identifier to generate a pseudo-random string of numbers. Such algorithms are well-known for use with securing personal computers or personal digital assistants (PDAs), the user having a hand-held electronic key device which displays a key number which changes at regular intervals. The device to be secured runs the same algorithm using the same starting data to generate the same numbers internally in synchrony with the key device. The user enters the key number to unlock the computer or PDA. In the present embodiment, that type of algorithm will be extended to generate, say, a 25 digit key number instead of the 5 or 6-digit number conventionally used and to fill the challenge grid with these numbers. The algorithm can use key data such as a terminal identifier, a personal identifier, and account number, a mobile telephone number, where the terminal is a mobile telephone, or combinations of these. The authenticator uses the same algorithm to generate the same 25-digit string based on the same key data and the transaction time stamp. In this way, the verification can be carried out without the need for any grid information to be transmitted. As an alternative to the use of the time stamp, the algorithm may calculate the grid based on the preceding time as well as the current time and use both (or indeed several, depending on the time latitude allowed by the system) to determine whether any of them produces a pattern match to verify identity.

It will be understood that hybrid methods between this method and the other methods described could be used. For example, the number-generation algorithm could be used to generate a code identifying a grid to be selected from a separate database, or from a plurality of grids pre-stored in the terminal, the authenticator then running the algorithm with the same "seeds" to generate the code and thereby identify the correct grid for comparison purposes.

Figure 10:
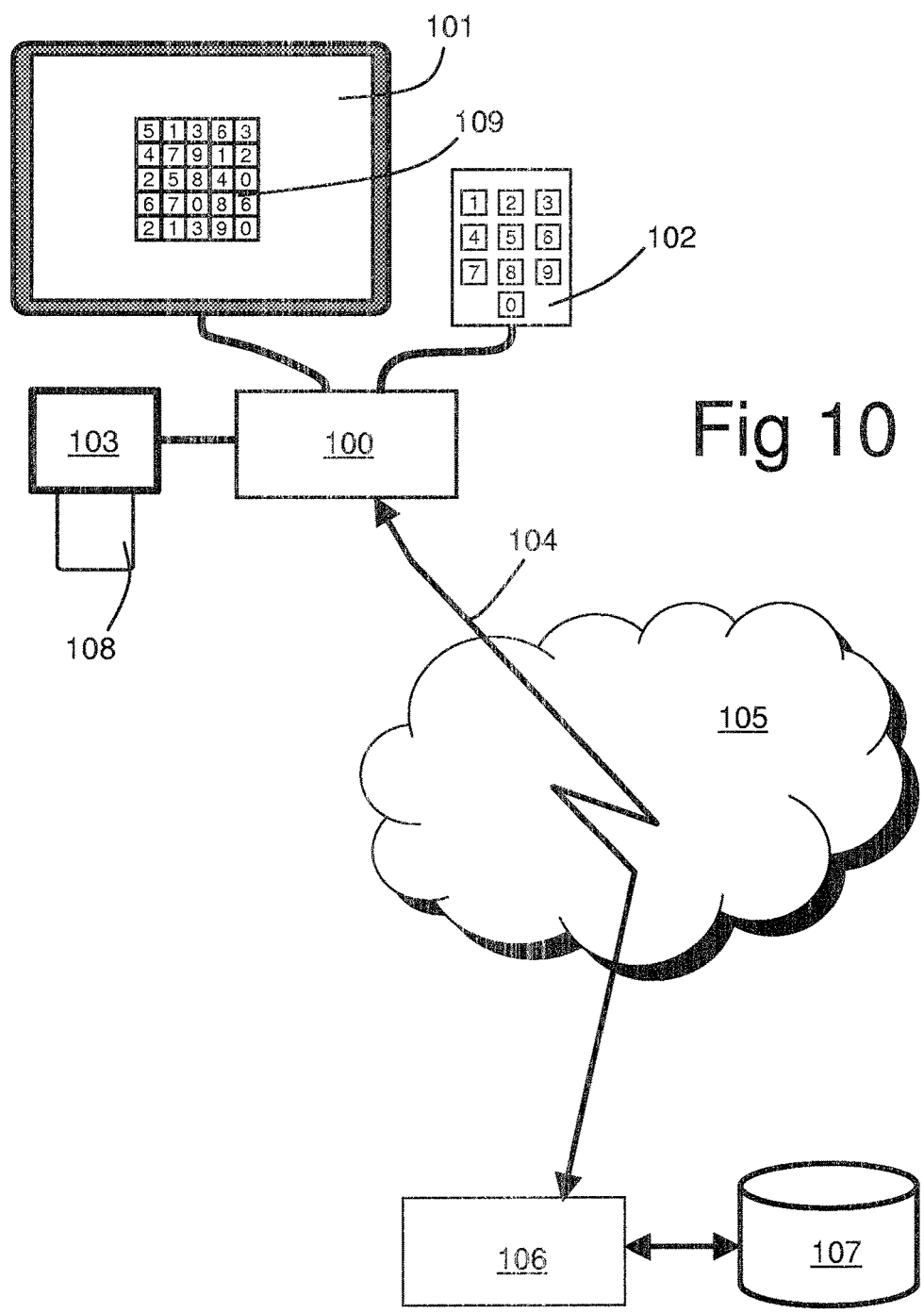
FIG. 10 illustrates apparatus for verification of a transaction according to another embodiment of the invention.

FIG. 10 illustrates typical apparatus used in an on-line transaction. A user terminal, which could be, for example, an ATM, or even a personal computer, has a central processing unit 100 connected to a display screen 101, a numeric key pad 102 and a card reader 103. A network connection 104, for example via the Internet represented at 105, leads to a remote transaction authentication processor 106, linked to a database 107 which stores user details and the associated personal identification pattern (PIP). To start the transaction, the user inserts a personal card 108, for example a debit or credit card, into the reader 103. The user's account number is read from the card, and the terminal then generates a challenge grid 109, for example of 25 squares containing pseudo-randomly-generated digits from 0 to 9, and displays it on the display screen 101 with an invitation to the user to enter on the key pad 102 the digits occupying the user's PIP in the grid. The terminal then initiates a connection to the transaction authentication processor 106 to transmit in encrypted form the user's account number, the amount of the transaction, the digits entered by the user, and the challenge grid. On receipt of the data, the authentication processor 106 uses the account number to retrieve from the database 107 the user's PIP and credit/account data. The verification is then carried out as described hereinbefore with reference to FIG. 6, and if identity is confirmed and the transaction is otherwise acceptable, the authentication processor 106 transmits back to the terminal an authorisation code so that the terminal can complete the transaction.

Figure 11:
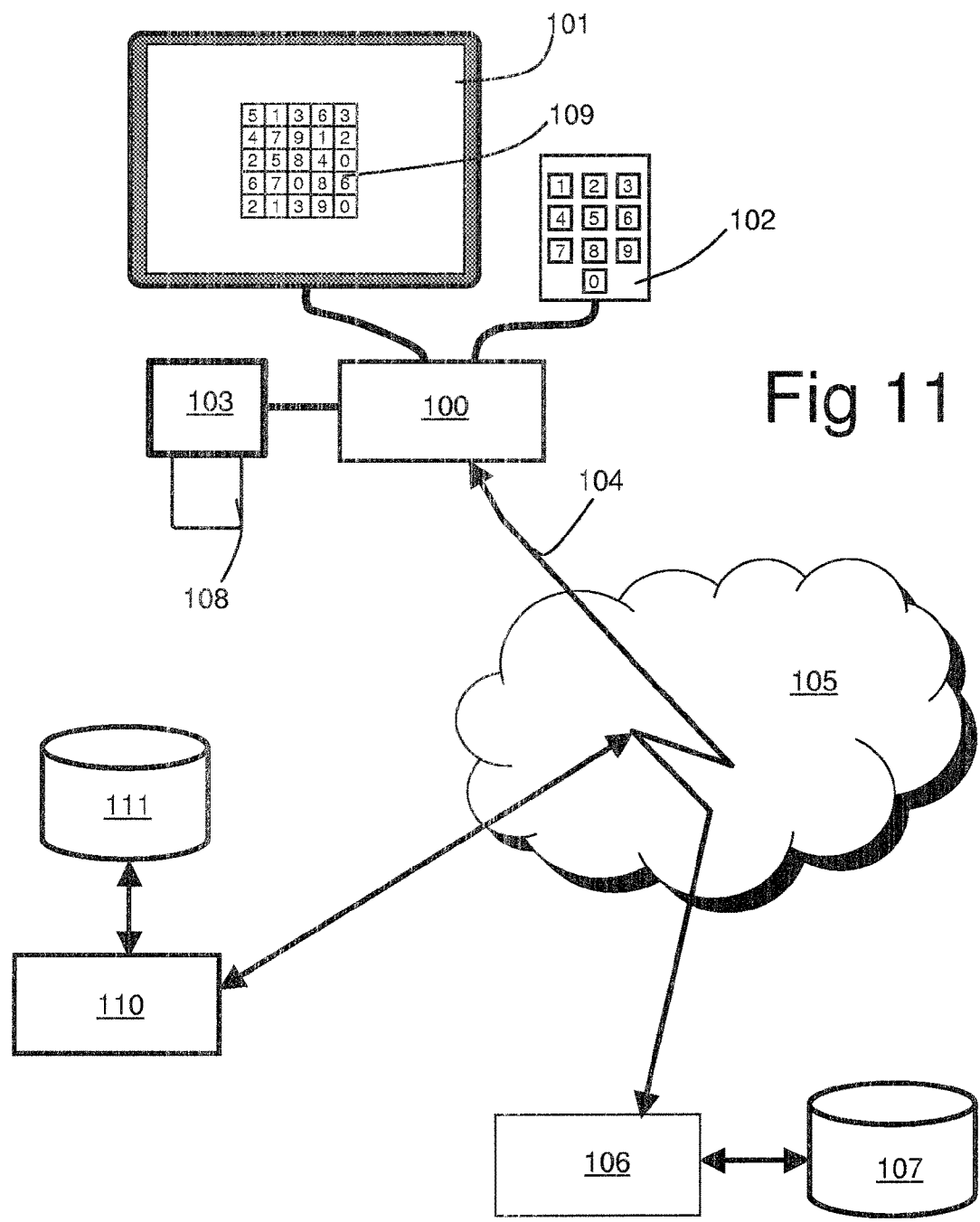
FIG. 11 illustrates a variant of the apparatus of FIG. 10, using an external database of standard challenge grids, for example as in the method illustrated in FIG. 7.

FIG. 11 illustrates apparatus performing a variant of this procedure, as described with reference to FIG. 7. This adds a separate challenge grid processor 110 having a database 111 of challenge grids, each having a unique identifier associated with it. The grid process 110 may be remote both from the user terminal and from the authentication processor 106, and the connection between them may be via a network link 112, for example via the Internet 105.

Figure 12:
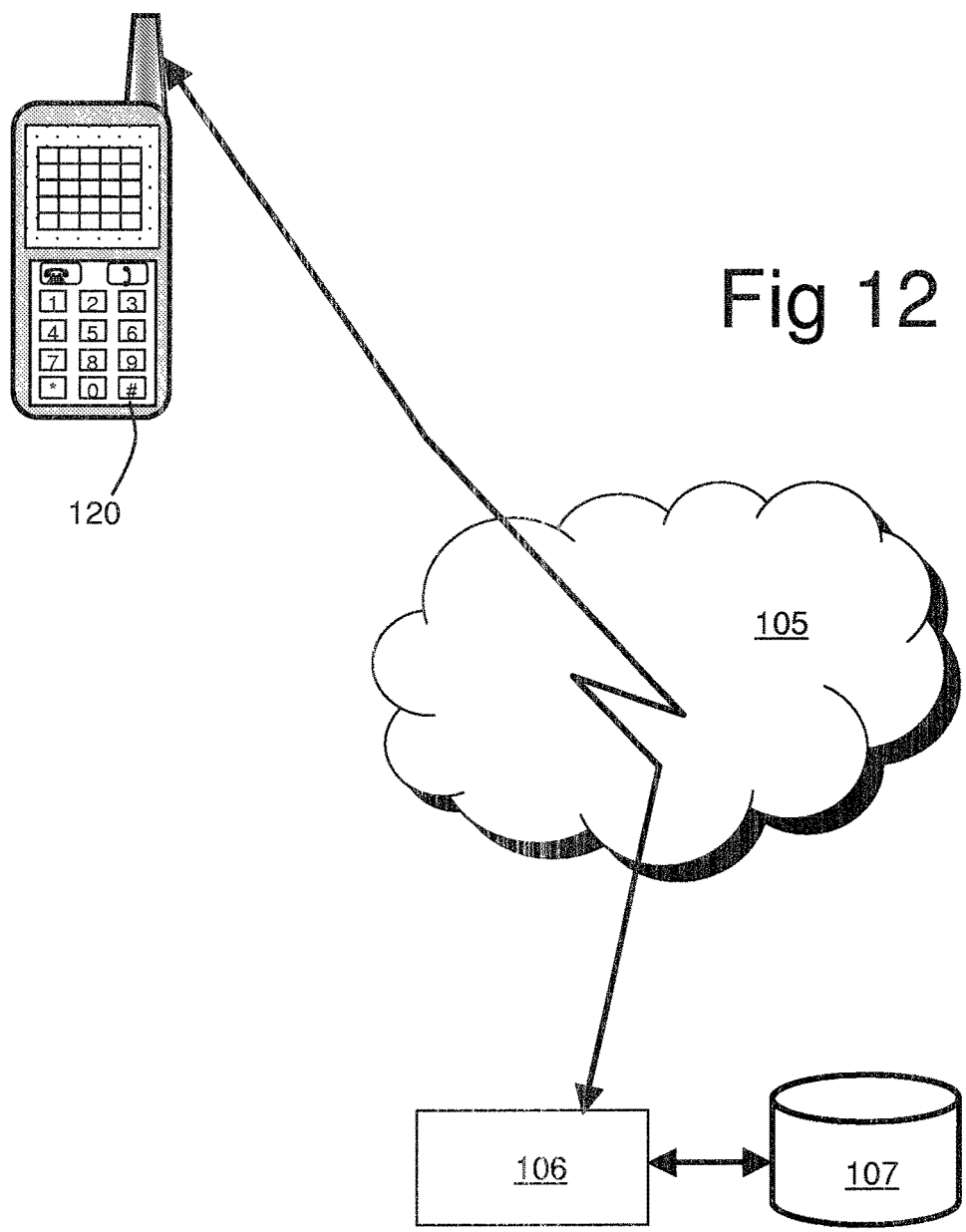
FIG. 12 illustrates a variant on the apparatus of FIG. 10, using a cellular telephone as the verification user terminal.

FIG. 12 illustrates another embodiment, in which the user's mobile or cellular telephone 120 serves as the user terminal. In this case, the telephone 120 also stores the user's personal and account details, instead of these being stored in a separate transaction card. The process can be as described with reference to any of FIGS. 6 to 9, with transmissions to and from the authentication processor being carried wirelessly, for example using any of the wireless data networks or methods, such as GPRS.

Figure 13:
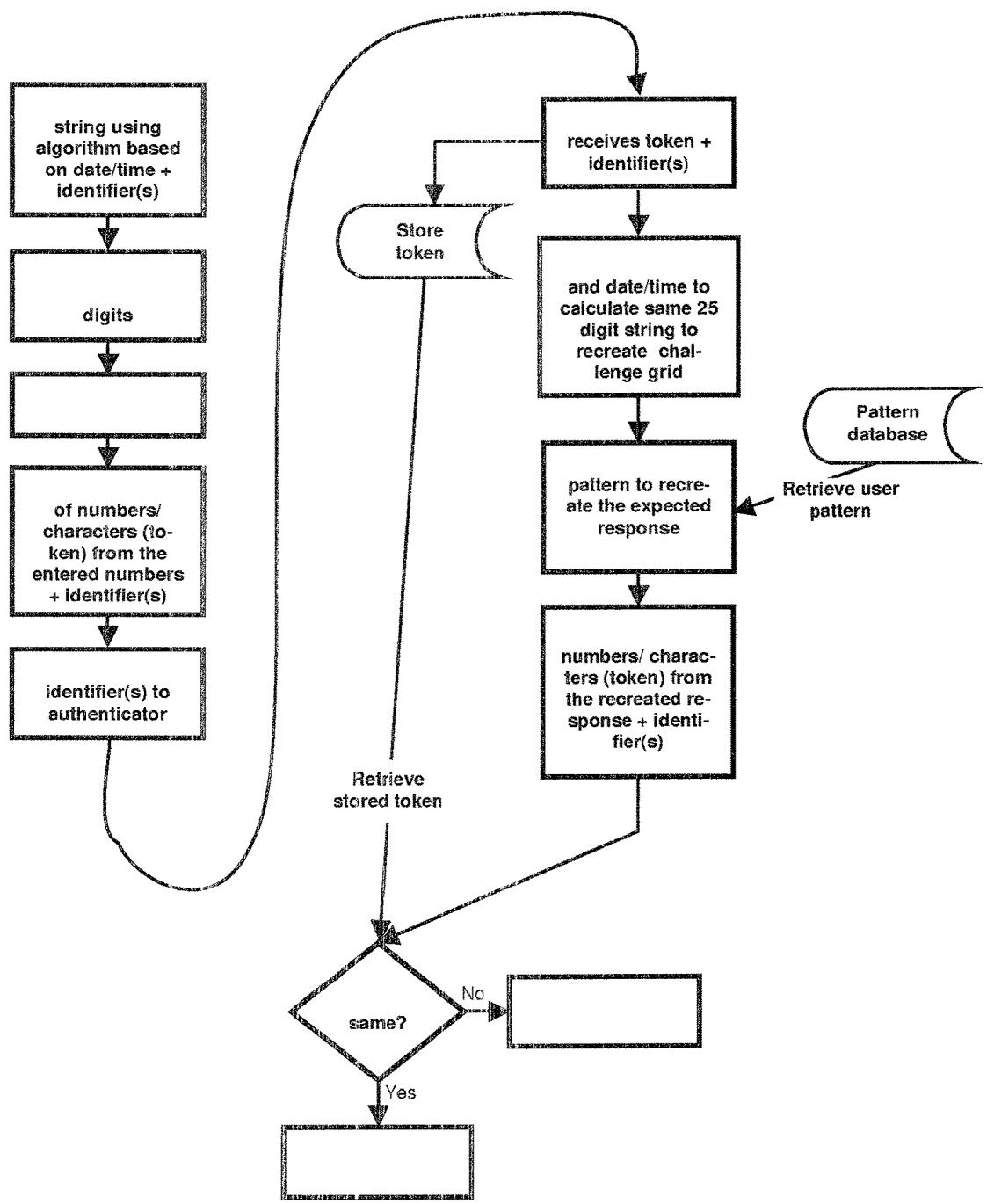
FIG. 13 is a flow chart illustrating a method of verification according to yet another embodiment of the invention.

FIG. 13 is a flow chart of yet another method, which is a development of the method illustrated in FIG. 9. After the grid is generated by the algorithm and the user enters a response string, another algorithm is used to generate from the response string and one or more of the identifiers mentioned in the method described with reference to FIG. 9 a "token", for example in the form of a ten-digit number (or perhaps a string of letters and numbers) which disguises the response, but in a manner which will be recognisable to the authenticating authority having the same identifiers available. The token is then transmitted to the authenticating authority together with at least one of the identifiers.

The authenticating authority stores the token temporarily while using the same algorithm and the identifier(s) to calculate the same 25 digit string to recreate the challenge grid. The user's secret pattern is retrieved from the pattern database and is used to extract from the challenge grid the expected correct response. In a final step, this expected response (a string of 4 numbers, say) is entered into the token algorithm using the necessary identifiers, at least one of which was transmitted with the token from the user, to calculate the token. This can then be compared with the transmitted token. If they are the same, identity is verified, otherwise the transaction is rejected.

A variation of this process may be used to secure the transmission of e-mail messages. The sender runs on his e-mail terminal a verification process which could, for example, be based on identifiers stored in his terminal (a personal computer or a portable communications device, for example). This generates a challenge grid using a number generating algorithm as described with reference to FIGS. 9 and 13. The response is then converted into a token, as described with reference to FIG. 13, the token also encoding the transmission date and time. The token is inserted into the e-mail message and transmitted to the recipient. The recipient then runs a corresponding verification process which uses the attached key to confirm the identity of the sender, according to pre-stored information. The date and time of transmission as indicated on the e-mail message are used by the verification process to regenerate the token, which is carried out in the manner described with reference to FIG. 13, and if the tokens do not match, then this is an indication that the e-mail has been tampered with or was not sent by the supposed sender.

Figure 14:
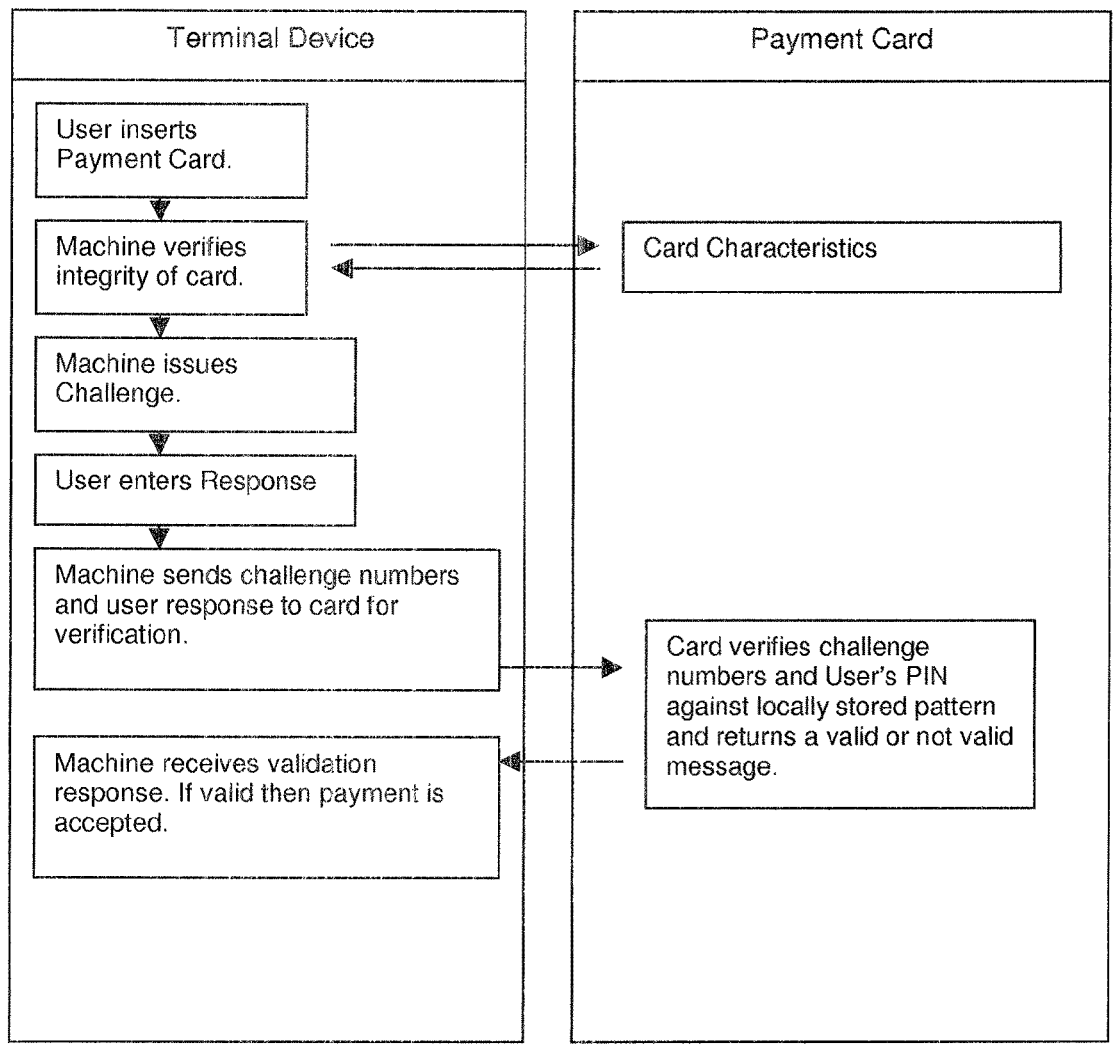
FIG. 14 is a diagrammatic illustration of the apparatus and method for local verification of the user's identity using the user's credit or other data card.

FIG. 14 illustrates the method and apparatus for offline or local verification, using a terminal device and payment card. This is similar to what is used currently in stores and restaurants under "Chip & PIN", in which the PIN is checked locally by the card reader with the credit or debit card; in this case there is no need for immediate connection to a remote authorising computer. In the method and apparatus of this aspect of the invention, the user inserts the payment card into the terminal device, in the case of a typical contact card so that electrical connections can be established with the electronic chip embedded in the card. It will be appreciated, however, that a similar method could be conducted with a contactless card that establishes its connections inductively or wirelessly. The terminal machine then verifies the integrity of the card, checking certain basics card characteristics. When this stage has been successfully completed, the machine issues its challenge by presenting the user with a challenge grid of numbers and inviting the user to enter the response code, consisting of the numbers in the grid which occupy positions in the user's personal pattern and sequence. The terminal sends the response to the card chip, along with the challenge numbers, for verification.

The card uses the challenge grid, the response numbers and the user's stored pattern (stored only in the card chip, and not communicated outside the chip) to determine whether the response corresponds to the correct pattern in the challenge grid and then returns a valid or invalid message to the terminal. If the message received in the terminal indicates a valid response, the payment is accepted. It will be appreciated that, in the case of an online terminal, for example an ATM, the receipt of the valid message would then trigger a transmission to the authorising computer of the account details and the amount of the transaction with a request for authorisation.

Figure 15:
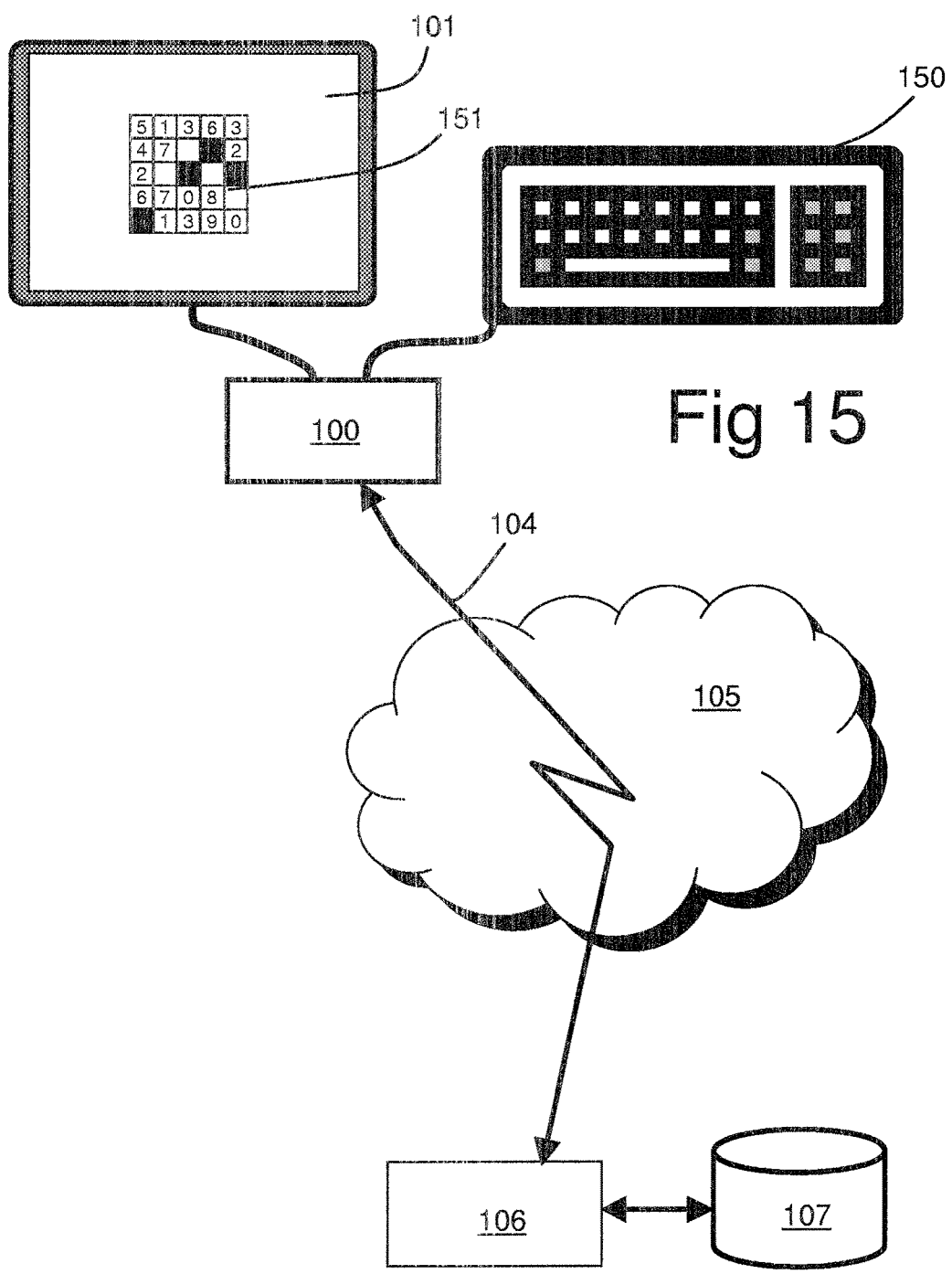
FIG. 15 illustrates apparatus which may be used in providing the user with a verification of the authenticity of a transaction organisation.

FIG. 15 shows apparatus which is essentially the same as in FIG. 10, but configured without a card reader for on-line transactions, and illustrates another aspect of the invention, in which the user can obtain verification of the authenticity of a transaction organisation, such as an on-line bank, thereby avoiding the risk of falling victim to "phishing". To ensure that the on-line organisation is the genuine organisation with which the user initially registered personal details, part of the registration process will include the user selecting a personal pattern and sequence of locations in a grid and registering this personal pattern with the organisation. A personal identification number (PIN) will also be registered for the user. During a transaction, the user will first identify him or herself, for example simply by name, using the keyboard 150. The authentication processor 106 will look up the user's personal pattern and PIN in the database 107 and cause a grid of pseudo-random numbers to be generated in which the user's PIN is embedded in the user's personal pattern locations. The grid 151 is then displayed on the display screen 101. In FIG. 15, the user's PIN 5946 set out in the user's personal pattern is highlighted by being displayed in reverse type, but in practice there would, of course, be nothing to distinguish it from the surrounding pseudo-random numbers. The user could then confirm that the PIN does indeed appear in the correct grid positions before continuing with the transaction.

The invention claimed is:

1. A method for verifying an identity of a person, comprising a registration step of storing for the person in a verification device a personal pattern of a number of locations on a grid in association with personal identification data, and
a subsequent verification step which comprises:
 (a) presenting to the person, via a user terminal, a challenge grid of locations occupied by a pseudo-random set of symbols, wherein the challenge grid does not include transaction specific information, and challenging the person to:
  identify a response set of symbols occupying locations in the challenge grid corresponding to the stored personal pattern, and
  input to the user terminal the response set;
 (b) causing the user terminal to transmit to the verification device the response set of symbols and the challenge grid having an identifier for identifying the challenge grid;
 (c) receiving the response set and the challenge grid having the identifier in the verification device from the user terminal and causing the verification device to generate, upon receipt of the response set and the challenge grid having the identifier, a verification set of symbols by applying the stored personal pattern to the received challenge grid having the identifier, the verification set of symbols being those symbols occupying locations in the received challenge grid having the identifier corresponding to the stored personal pattern;
 (d) comparing the response set of symbols with the verification set of symbols; and
 (e) verifying the identity of the person by determining whether the response set of symbols is the same as the verification set of symbols.

2. The method according to claim 1, wherein the registration step comprises: providing the person with a grid, and inviting the person to select the personal pattern of locations.

3. The method according to claim 1, wherein the verification device is a transaction authorising computer at a location remote from the person.

4. The method according to claim 3, wherein step (a) comprises generating the challenge grid having the identifier in the user terminal.

5. The method according to claim 4, comprising using an algorithm in the user terminal to generate the pseudo-random set of symbols based in part on the date and/or time of day and identity data of the user terminal and/or the person to construct the challenge grid to be presented to the person, and transmitting to the transaction authorising computer at least the response set and the identity data, the transaction authorising computer using the same algorithm and the identity data and the date and/or time of day to generate the same pseudo-random set of symbols, thereby to recreate the challenge grid for use of the transaction authorising computer.

6. The method according to claim 4, wherein the user terminal is an automated teller machine (ATM).

7. The method according to claim 4, wherein the user terminal is a computer which, in use, is connected to the transaction authorising computer via a network connection.

8. The method according to claim 4, wherein the user terminal is a portable electronic device which, in use, is connected to the transaction authorising computer through a wireless connection.

9. The method according to claim 4, wherein the transmission to the transaction authorising computer includes verbal communication.

10. The method according to claim 1, wherein the person also communicates to the transaction authorising computer information from an identity or transaction memory device.

11. The method according to claim 10, wherein the transaction memory device is in or on a credit or debit card.

12. The method according to claim 10, wherein the transaction memory device is embedded within a portable electronic device carried by the person.

13. The method according to claim 1, wherein the personal pattern includes a sequence in which the locations are used.

14. The method according to claim 1, wherein in step (a), the challenge grid is provided to the person from a memory chip in a credit or debit card.

15. The method according to claim 14, wherein in step (a), the grid is read from the memory chip by a card reader.

16. The method according to claim 15, wherein the card reader is provided in a portable electronic device in the possession of the person.

17. The method according to claim 1, wherein the verification device is an electronic device carried by the person.

18. The method according to claim 17, wherein the electronic device is incorporated in a transaction or identification card.

19. The method according to claim 1, wherein the verification device is an access control computer.

20. A method for verifying an identity of a person, comprising a registration step of storing for the person in a verification device a personal pattern of a number of locations on a grid in association with personal identification data, and a subsequent verification step which comprises:
   (a) presenting to the person a challenge grid of locations occupied by a pseudo-random set of symbols, and challenging the person to:
   identify a response set of symbols occupying locations in the challenge grid having an identifier, corresponding to the stored personal pattern, and
   input to a user terminal the response set;
   (b) causing the user terminal to transmit to the verification device the response set of symbols and data enabling the verification device to recreate the challenge grid, wherein the data includes the identifier of the challenge grid;
   (c) receiving the response set and the data in the verification device and causing the verification device to recreate the challenge grid based in part on the data and then to generate from the recreated challenge grid a verification set of symbols occupying locations in the recreated challenge grid corresponding to the stored personal pattern;
   (d) comparing, at the verification device, the response set of symbols with the verification set of symbols; and
   (e) verifying, at the verification device, the identity of the person by determining whether the response set is the same as the verification set.

21. The method according to claim 20, comprising using a second algorithm to generate from the response set and an additional identifier a received token consisting of a string of symbols concealing the response set, and wherein the step (b) comprises using the recreated challenge grid to generate the verification set, applying the second algorithm using the additional identifier to generate a generated token from the verification set, and step (c) comprises comparing the received token with the generated token.

22. The method according to claim 21, wherein the additional identifier is at least one factor from:
   (i) the transaction time and/or date;
   (ii) a personal or account identifier;
   (iii) a terminal identifier;
   (iv) a public/private data key;
   (v) the payment amount, in the case of a payment transaction; and
   (vi) all or part of the payee account number.

23. A method for verifying an identity of a person, comprising a registration step of storing for the person in a verification device a personal pattern of a number of locations on a grid in association with personal identification data, and a subsequent verification step which comprises:
   (a) presenting to the person, via a user terminal, a challenge grid of locations occupied by a pseudo-random set of symbols, wherein the challenge grid does not include transaction specific information, and challenging the person to:
   identify a response set of symbols occupying locations in the challenge grid corresponding to the stored personal pattern, and
   input to the user terminal the response set;
   (b) causing the user terminal to transmit to the verification device the response set of symbols and identifying data enabling the verification device to identify the challenge grid, wherein the identifying data include an identifier of the challenge grid;
   (c) receiving, at the verification device, the response set and the identifying data and causing the verification device to identify the challenge grid based on the identifying data and to generate a verification set of symbols by applying the stored personal pattern to the identified challenge grid, the verification set of symbols being those symbols occupying locations in the identified challenge grid corresponding to the stored personal pattern;
   (d) comparing the response set of symbols with the verification set of symbols; and
   (e) verifying the identity of the person by determining whether the response set is the same as the verification set.

24. The method according to claim 23, wherein step (a) comprises algorithmically selecting in the user terminal one of a plurality of challenge grids previously supplied to the user terminal by a transaction authorising body or the verification device and stored in the user terminal, and transmitting to the transaction authorising body the response set and data identifying to the verification device the algorithmically selected grid.

25. The method according to claim 23, wherein step (a) comprises algorithmically selecting in the user terminal a start reference point in a large matrix of symbols previously supplied to the user terminal by a transaction authorising body or a transaction authorising computer and stored in the user terminal, presenting a challenge grid derived from the large matrix using the start reference point, and then transmitting to the authorising computer the response set and the start reference point.

26. The method according to claim 23, wherein step (a) comprises algorithmically selecting in the user terminal a predetermined number of symbols from a large matrix of symbols previously supplied to the user terminal by a transaction authorising body or the transaction authorising computer and stored in the user terminal, presenting a challenge grid of the selected symbols, and then transmitting to the transaction authorising computer the response set, and wherein in step (d) the transaction authorising computer applies the same algorithm to select from the large matrix previously supplied the same symbols to reconstruct the challenge grid.

27. The method according to claim 23, wherein step (a) comprises receiving in the user terminal a start reference point transmitted thereto by the verification device, the start reference point indicating a position in a large matrix of symbols previously supplied to the user terminal by an authorising body or the authorising computer and stored in the user terminal, presenting a challenge grid derived from the large matrix using the start reference point, and then transmitting to the verification device the response set.

28. The method according to claim 23, wherein step (a) comprises retrieving from a database of grids independent of an authorising computer an algorithmically selected one of a plurality of grids stored in the database, the grid having a unique grid identifier, and transmitting to the authorising computer the response set and the unique grid identifier, and step (b) comprises causing the database of grids to retrieve the challenge grid.

29. An apparatus for use in verifying an identity of a person, comprising a verification device for receiving and storing identification data for the person and a personal pattern of locations on a grid, and for causing a user terminal at a location of the person to present to the person a challenge grid having an identifier and an invitation to the person to identify in response thereto a response set of symbols occupying locations in the challenge grid corresponding to the stored personal pattern,
  wherein the challenge grid comprises locations occupied only by a pseudo-random set of symbols, and the challenge grid does not include transaction specific information, and
  wherein the verification device is arranged to receive the response set and the challenge grid from the user terminal and to generate, upon receipt of the response set and the challenge grid, a verification set of symbols by applying the stored personal pattern to the challenge grid, the verification set of symbols occupying locations in the challenge grid corresponding to the stored personal pattern, and
  wherein the verification device is further configured to compare the response set of symbols with the verification set of symbols, and to verify the identity of the person determining whether the response set is the same as the verification set.

30. The apparatus according to claim 29, wherein the personal pattern of locations is a pattern chosen initially by the user.

31. The apparatus according to claim 29, wherein the verification device comprises a transaction authorising computer.

32. The apparatus according to claim 31, wherein the user terminal is a computer which, in use, is connected to the transaction authorising computer via a network connection.

33. The apparatus according to claim 31, wherein the user terminal is a portable electronic device which, in use, is connected to the transaction authorising computer through a wireless connection.

34. The apparatus according to claim 29, wherein the user terminal is remote from the verification device.

35. The apparatus according to claim 34, wherein the user terminal is programmed to generate the challenge grid.

36. The apparatus according to claim 34, wherein the user terminal is an automated teller machine (ATM).

37. The apparatus according to claim 29, wherein the user terminal is arranged to communicate to the verification device information from an identity or transaction memory device.

38. The apparatus according to claim 37, wherein the transaction memory device is in or on a credit or debit card.

39. The apparatus according to claim 37, wherein the transaction memory device is embedded within a portable electronic device carried by the person.

40. The apparatus according to claim 37, wherein the user terminal comprises, in combination, a memory chip in a card, and a card reader.

41. The apparatus according to claim 40, wherein the card reader is incorporated into a mobile or cellular telephone.

42. The apparatus according to claim 29, wherein the verification device is an electronic device carried by the person.

43. The apparatus according to claim 42, wherein the electronic device is incorporated in a transaction or identification card.

44. An access control system, comprising apparatus according to claim 29, wherein the verification device is an access control computer programmed to allow access in response to verification of identity.

45. The access control system according to claim 44, wherein the access control computer controls release of a lock or latch.

46. An apparatus for use in verifying an identity of a person, comprising a verification device for receiving and storing identification data for the person and a linked pattern of locations on a grid, and for causing a user terminal at a location of the person to present to the person a challenge grid and an invitation for the person to identify in response thereto a response set of symbols occupying locations in the challenge grid corresponding to the stored personal pattern in the verification device,
  wherein the challenge grid comprises locations occupied only by a pseudo-random set of symbols, and the challenge grid does not include transaction specific information; and
  wherein the verification device is arranged to;
  receive the response set and data enabling the verification device to recreate the challenge grid from the user terminal, wherein the data includes the identifier of the challenge grid,
  recreate the challenge grid from the received data;
  generate from the recreated challenge grid and the stored personal pattern a verification set of symbols occupying locations in the received challenge grid corresponding to the stored personal pattern; and
  compare the response set of symbols with the verification set of symbols to verify the identity of the person by determining whether the response set is the same as the verification set.

47. Apparatus The apparatus according to claim 46, wherein the user terminal is programmed to use an algorithm to generate a pseudo-random string of symbols based in part on the date and/or time of day and identity data of the user terminal and/or the person to construct the challenge grid, and arranged to transmit to a transaction authorising computer at least the identity data, and
  wherein the transaction authorising computer is programmed to use the identity data and the date/time of day to generate, using the same algorithm, the same pseudo-random string of symbols, thereby to recreate the challenge grid.

48. The apparatus according to claim 46, wherein the user terminal is programmed to use a second algorithm to generate from the response set and an additional identifier a received token consisting of a string of symbols concealing the response set, and a transaction authorising computer is programmed to use the recreated challenge grid to generate the verification set of symbols, to apply the second algorithm using the additional identifier to generate a generated token from the verification set, and then comparing the received token with the generated token to establish or deny verification.

49. The apparatus according to claim 48, wherein the additional identifier is at least one of:
  (i) the transaction time and/or date;
  (ii) a personal or account identifier;
  (iii) a terminal identifier;
  (iv) a public/private data key;

(v) the payment amount, in the case of a payment transaction; or (vi) all or part of the payee account number.

50. The apparatus according to claim 46, wherein the user terminal is programmed to select algorithmically a predetermined number of symbols from a large matrix of symbols previously supplied to the user terminal by a transaction authorising body or a transaction authorising computer and stored in the terminal, to present a challenge grid of the selected symbols, and then to transmit to the authorising computer the response set, and wherein the transaction authorising computer is programmed to apply the same algorithm to select from the large matrix previously supplied the same symbols to reconstruct the challenge grid.

51. The apparatus according to claim 46, wherein the user terminal is programmed to receive a start reference point transmitted thereto by the verification device, the start reference point indicating a position in a large matrix of symbols previously supplied to the user terminal and stored therein, to present a challenge grid derived from the large matrix using the start reference point, and then to transmit to the verification device at a location remote from the user terminal the response set.

52. An apparatus for use in verifying an identity of a person, comprising:

a verification device for receiving and storing identification data for the person and a personal pattern of locations on a grid, and a user terminal at a location of the person for presenting to the person a challenge grid and an invitation to the person to identify in response thereto a response set of symbols occupying locations in the challenge grid corresponding to the stored personal pattern in the verification device, wherein the challenge grid presented to the person, via the user terminal, comprises locations occupied only by a pseudo-random set of symbols, and the challenge grid includes an identifier; and wherein the verification device is arranged to:

receive from the user terminal the response set of symbols and data enabling the verification device to identify the challenge grid, the data including the identifier of the challenge grid;

identify the challenge grid based in part on the received data;

generate a verification set of symbols by applying the stored personal pattern to the identified challenge grid, the verification set of symbols being those symbols occupying locations in the identified challenge grid corresponding to the stored personal pattern;

compare the response set of symbols with the verification set of symbols, and verify the identity of the person by determining whether the response set is the same as the verification set.

53. The apparatus according to claim 52, wherein the user terminal is programmed to select algorithmically one of a plurality of challenge grids previously supplied to the user terminal and stored therein, and arranged to transmit to the transaction authorising computer the response set and data identifying the selected grid.

54. The apparatus according to claim 52, wherein the user terminal is programmed to select algorithmically a start reference point in a large matrix of symbols previously supplied to the user terminal and stored therein, to present a challenge grid derived from the large matrix using the start reference point, and then to transmit to a transaction authorising computer the response set and the start reference point.

55. The apparatus according to claim 52, wherein the user terminal is programmed to retrieve from a database of grids independent of a transaction authorising computer and of the person an algorithmically selected one of a plurality of grids stored in the database, each grid having a unique grid identifier, and to transmit to the transaction authorising computer at a location remote from the user terminal the response set and the unique grid identifier of the algorithmically selected grid, and wherein the transaction authorising computer is programmed to transmit the unique grid identifier of the algorithmically selected grid to the database of grids to retrieve the challenge grid corresponding to the algorithmically selected grid.

56. A method for verifying an identity of a person, comprising a registration step of storing for the person in a verification device a personal pattern of a number of locations on a grid in association with personal identification data, and a subsequent verification step which comprises:

(a) presenting to the person, via a user terminal, a challenge grid of locations occupied by a pseudo-random set of symbols, wherein the challenge grid does not include transaction specific information, and challenging the person to:

identify a response set of symbols occupying locations in the challenge grid corresponding to the stored personal pattern, and input to the user terminal the response set;

(b) causing the user terminal to transmit to the verification device the response set of symbols, the challenge grid, and an identifier for identifying the user;

(c) receiving in the verification device the response set, the challenge grid, and the identifier from the user terminal and causing the verification device to generate, upon receipt of the response set and the challenge grid, a verification set of symbols by applying the stored personal pattern to the received challenge grid, the verification set of symbols being those symbols occupying locations in the received challenge grid corresponding to the stored personal pattern;

(d) comparing the response set of symbols with the verification set of symbols; and (e) verifying the identity of the person by determining whether the response set of symbols is the same as the verification set of symbols.

57. The method according to claim 56, wherein the verification device is a transaction authorising computer at a location remote from the person.

58. The method according to claim 57, wherein the user terminal is a computer which, in use, is connected to the transaction authorising computer via a network connection.

59. The method according to claim 57, wherein the user terminal is a portable electronic device which, in use, is connected to the transaction authorising computer through a wireless connection.

60. The method according to claim 57, wherein the transmission to the transaction authorising computer includes verbal communication.

61. The method according to claim 57, wherein the person also communicates to the transaction authorising computer information from an identity or transaction memory device.

62. The method according to claim 61, wherein the transaction memory device is in or on a credit or debit card.

63. The method according to claim 61, wherein the transaction memory device is embedded within a portable electronic device carried by the person.

64. The method according to claim 56, wherein the user terminal is an automated teller machine (ATM).

65. The method according to claim 56, wherein in step (a), the challenge grid is provided to the person from a memory chip in a credit or debit card.

66. The method according to claim 65, wherein in step (a), the grid is read from the memory chip by a card reader.

67. The method according to claim 66, wherein the card reader is provided in a portable electronic device in the possession of the person.

68. The method according to claim 56, wherein the verification device is an electronic device carried by the person.

69. The method according to claim 68, wherein the electronic device is incorporated in a transaction or identification card.

* * * * *